(12) United States Patent
Migita et al.

(10) Patent No.: US 9,834,019 B2
(45) Date of Patent: Dec. 5, 2017

(54) RECORDING APPARATUS

(71) Applicant: SEIKO EPSON CORPORATION, Tokyo (JP)

(72) Inventors: Koji Migita, Matsumoto (JP); Masaki Shimomura, Matsumoto (JP); Toshihiro Imae, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/386,083

(22) Filed: Dec. 21, 2016

(65) Prior Publication Data

US 2017/0190193 A1  Jul. 6, 2017

(30) Foreign Application Priority Data

Jan. 5, 2016  (JP) ................................. 2016-000664

(51) Int. Cl.
*B41J 29/02* (2006.01)
*H04N 1/00* (2006.01)
*G03G 21/16* (2006.01)

(52) U.S. Cl.
CPC .......... *B41J 29/02* (2013.01); *G03G 21/1628* (2013.01); *H04N 1/00554* (2013.01)

(58) Field of Classification Search
CPC ............................. B41J 29/02; G03G 21/1628
USPC ....................................................... 399/125
See application file for complete search history.

(56) References Cited

U.S. PATENT DOCUMENTS

| 4,429,933 | A | * | 2/1984 | Sokolowski | ............ E05C 17/32 16/333 |
|---|---|---|---|---|---|
| 2010/0284722 | A1 | * | 11/2010 | Kitayama | .............. G03G 15/60 399/410 |
| 2014/0293359 | A1 | * | 10/2014 | Niikawa | ............ H04N 1/00543 358/300 |
| 2014/0318291 | A1 | * | 10/2014 | Tsuchiya | ................. F16H 37/12 74/96 |
| 2016/0286062 | A1 | * | 9/2016 | Tomatsu | ............ H04N 1/00551 |

FOREIGN PATENT DOCUMENTS

| JP | 2001-288947 | 10/2001 |
|---|---|---|
| JP | 2005-189552 | 7/2005 |
| JP | 2012-183677 | 9/2012 |

* cited by examiner

*Primary Examiner* — Shelby Fidler
(74) *Attorney, Agent, or Firm* — Workman Nydegger

(57) ABSTRACT

A recording apparatus includes: a recording mechanism unit; an opening/closing unit that opens and closes the top portion of the recording mechanism unit; and a support member that holds the opening/closing unit in an opening state. The support member includes a first link portion that is rotatably connected to the opening/closing unit, a second link portion that is rotatably connected to the first link portion and that is rotatably connected to the recording mechanism unit, a first locking mechanism that holds the opening/closing unit in the opening state at a first angle, and a second locking mechanism that does not hold the opening/closing unit in the opening state at a second angle which is smaller than the first angle.

10 Claims, 32 Drawing Sheets

RECORDING APPARATUS

CROSS REFERENCES TO RELATED APPLICATIONS

The entire disclosure of Japanese Patent Application No. 2016-000664, filed Jan. 5, 2016 is expressly incorporated by reference herein.

BACKGROUND

1. Technical Field

The present invention relates to a recording apparatus that includes a recording mechanism unit having a recording unit which performs recording on a recording medium, and an opening/closing unit which is connected to the top portion of the recording mechanism unit so as to be rotatable with respect to the recording mechanism unit and which rotates, thereby opening and closing the top portion of the recording mechanism unit.

2. Related Art

A recording apparatus represented by a facsimile or a printer includes a so-called multifunction printer having an image reading function in addition to a recording function. In other words, a scanner unit is provided on the top of a main body of a recording mechanism unit that performs recording on a recording sheet.

The scanner unit is provided to be rotatable with respect to the recording mechanism unit and is capable of switching between an opening posture and a closing posture through the rotational movement. The scanner unit is held in the closed posture when used normally; however, the scanner unit is to be open for example, while jam clearing is performed in a case where a paper jam occurs inside the recording mechanism unit, or while replacement of an ink cartridge, maintenance other than the replacement, or the like is performed.

Hence, the scanner unit is provided to be able to maintain the opening posture, and a support structure as disclosed in JP-A-2005-189552 is employed as means for maintaining the opening posture in some cases. An image forming apparatus disclosed in JP-A-2005-189552 has a configuration in which a printer unit and a scanner unit are connected by a pair of link members, and, when the scanner unit is in the opening state, the pair of link members form a substantially straight line shape and hold the scanner unit in the opening state.

In the state in which the pair of link members form the straight line shape, the scanner unit is held in the opening state; however, even before the pair of link members form the straight line shape, the scanner unit stands in the opening state due to a load balance in some cases (hereinafter, this state is referred to as an "incomplete opening state). In this case, there is a concern that an operator will falsely recognize that the scanner unit is in a state of opening completely, and then will perform maintenance working on the printer unit while that scanner unit is in the incomplete opening state. It is not preferable that the scanner unit be in the incomplete opening state because the scanner unit is likely to be in the closing state due to the own weight thereof when a small force is applied to the pair of link members.

SUMMARY

An advantage of some aspects of the invention is to provide a recording apparatus in which it is possible for an operator to avoid falsely recognizing that an opening/closing unit is in an opening state although the opening/closing unit is in an incomplete opening state.

According to a first aspect of the invention, there is provided a recording apparatus including: a recording mechanism unit that has a recording unit which performs recording on a recording medium; an opening/closing unit that is rotatably connected to the top portion of the recording mechanism unit and that rotates, thereby opening and closing the top portion of the recording mechanism unit; and a support member that holds the opening/closing unit in an opening state. The support member includes a first link portion that is rotatably connected to the opening/closing unit, a second link portion that is rotatably connected to the first link portion and is rotatably connected to the recording mechanism unit, a first locking mechanism that stops a relative rotation of the first link portion and the second link portion in a state in which the first link portion and the second link portion relatively form a first angle therebetween, and that holds the opening/closing unit in the opening state, and a second locking mechanism that stops the relative rotation of the first link portion and the second link portion in an opening direction of the opening/closing unit in a state in which the first link portion and the second link portion relatively form the second angle therebetween which is smaller than the first angle and that does not hold the opening/closing unit in the opening state.

In this aspect, the first locking mechanism holds the opening/closing unit in the opening state. Thus, before the first locking mechanism locks the opening/closing unit, the second locking mechanism is provided to stop the relative rotation of the first link portion and the second link portion in the opening direction of the opening/closing unit and not to hold the opening/closing unit in the opening state. Hence, it is possible for an operator who opens and closes the opening/closing unit to avoid falsely recognizing that the opening/closing unit is in an opening state although the opening/closing unit is in an incomplete opening state.

In the recording apparatus according to a second aspect of the invention, the first angle may be an angle at which the first link portion and the second link portion form a straight line shape therebetween.

In this aspect, since the first angle is the angle at which the first link portion and the second link portion form a straight line shape therebetween, a load, which is applied to the support member by the opening/closing unit, is unlikely to lead to a relative rotation of the first link portion and the second link portion such that it is possible to effectively stop the relative rotation of the first link portion and the second link portion.

The recording apparatus according to a third aspect of the invention may further include a bias unit that biases the support member in a direction in which the first link portion and the second link portion form the first angle therebetween.

In this aspect, since the recording apparatus includes the bias unit that biases the support member in the direction in which the first link portion and the second link portion form the first angle therebetween, the bias unit can support opening work of the opening/closing unit such that it is possible to open the opening/closing unit with a smaller force.

In the recording apparatus according to a fourth aspect of the invention, the bias unit may be a tension spring that exerts a tensile force between the support member and the recording mechanism unit.

In this aspect, since the bias unit is the tension spring that exerts the tensile force between the support member and the recording mechanism unit, a bias force in an opening direction is unlikely to be applied to the opening/closing unit unlike a case of using, for example, a torsion spring as the bias unit when the opening/closing unit is in the closing state such that it is possible to appropriately hold the opening/closing unit in a closing state.

In the recording apparatus according to a fifth aspect of the invention, the second link portion may have an extension portion extending from a connection portion with the first link portion toward the opening/closing unit side. The second locking mechanism may be configured to have a projecting portion projecting on the extension portion toward the first link portion and to stop a relative rotation of the first link portion and the second link portion, with the projecting portion coming into contact with the first link portion.

In this aspect, since the second locking mechanism is configured to stop the relative rotation of the first link portion and the second link portion with the projecting portion provided on the second link portion coming into contact with the first link portion, the second locking mechanism can be configured to have a simplified structure at low costs.

In the recording apparatus according to a sixth aspect of the invention, the connection portion may be configured to have a rotary shaft which is provided on one of the first link portion or the second link portion, and an elongate hole which is provided on the other one thereof and into which the rotary shaft is loosely inserted. A hole, through which the projecting portion penetrates, may be formed in the first link portion. The first link portion may slide with respect to the second link portion in the state in which the projecting portion comes into contact with the first link portion, and thereby the projecting portion may penetrate through the hole.

In the recording apparatus according to a seventh aspect of the invention, the projecting portion may have a hook shape, and the projecting portion may penetrate through the hole so as to hook on an edge of the hole, and thereby the second locking mechanism may stop, along with the first locking mechanism, the relative rotation of the first link portion and the second link portion in the state in which the first link portion and the second link portion relatively form the first angle therebetween.

In this aspect, since the second locking mechanism stops, along with the first locking mechanism, the relative rotation of the first link portion and the second link portion in the state in which the first link portion and the second link portion relatively form the first angle therebetween, it is possible to much more firmly hold the opening/closing unit in the opening state.

In the recording apparatus according to an eighth aspect of the invention, the second locking mechanism and the first locking mechanism may be provided in this order from a connection site between the first link portion and the second link portion of the support member toward the opening/closing unit.

In this aspect, since the second locking mechanism and the first locking mechanism are provided in this order from the connection site between the first link portion and the second link portion of the support member toward the opening/closing unit, that is, since the projecting portion is provided at a position closer to the connection portion, it is possible to reduce a size of the projecting portion.

In the recording apparatus according to a ninth aspect of the invention, the first locking mechanism may be configured to stop the relative rotation of the first link portion and the second link portion by closing the opening/closing unit after further opening the opening/closing unit in the state in which the first link portion and the second link portion relatively form the first angle in a process of opening the opening/closing unit.

In the recording apparatus according to a tenth aspect of the invention, the opening/closing unit is configured to have a reading mechanism unit that reads an original document and a feeding mechanism unit that automatically feeds the original document to the reading mechanism unit.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described in detail with reference to the figures. Note that, the same reference signs are assigned to the same configurations in Examples, thus only a first example is described, and description of the configurations in the other examples is omitted.

Figure 1:
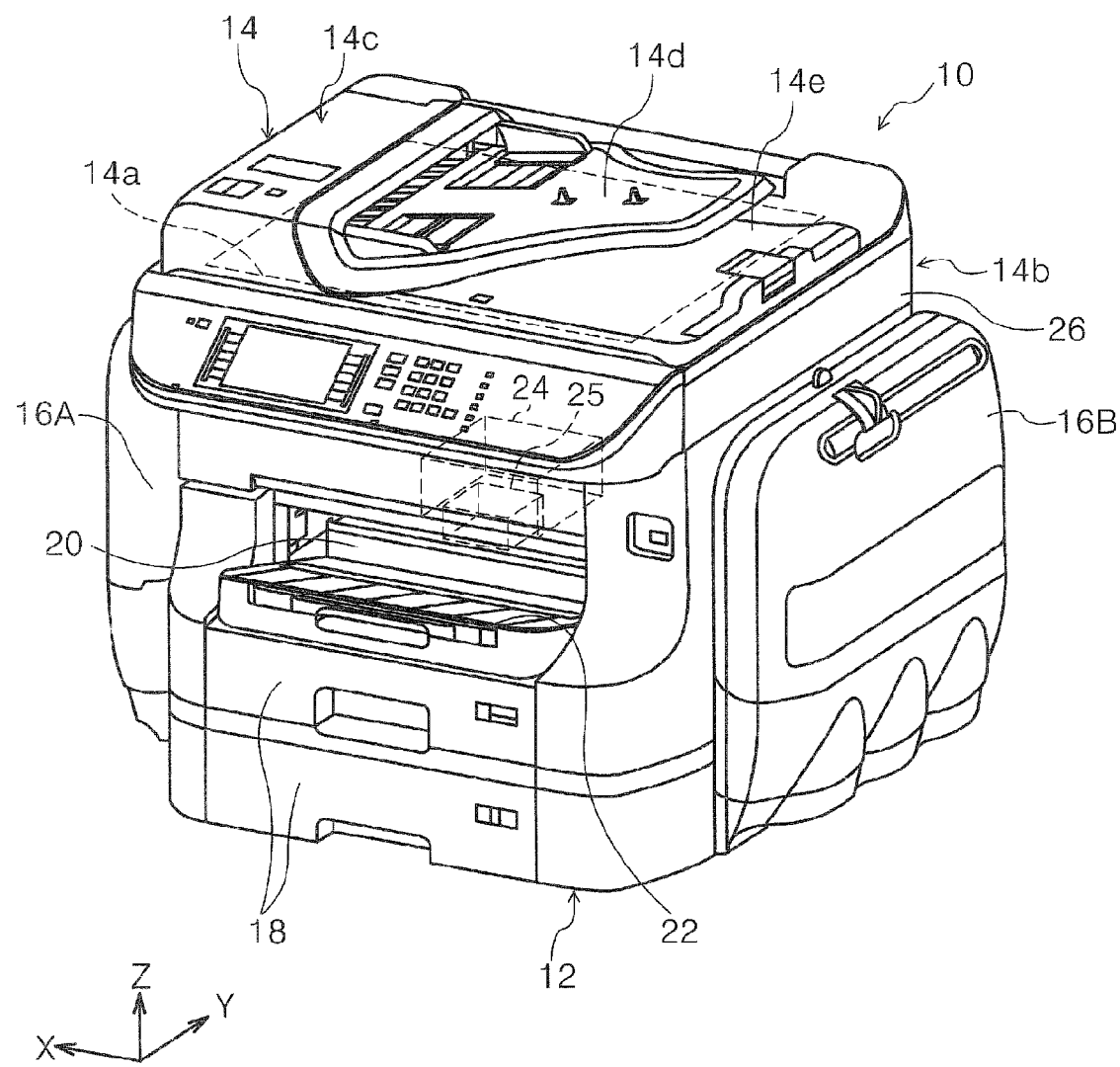
FIG. 1 is a perspective view illustrating the external appearance of a printer according to the invention.
Figure 2:
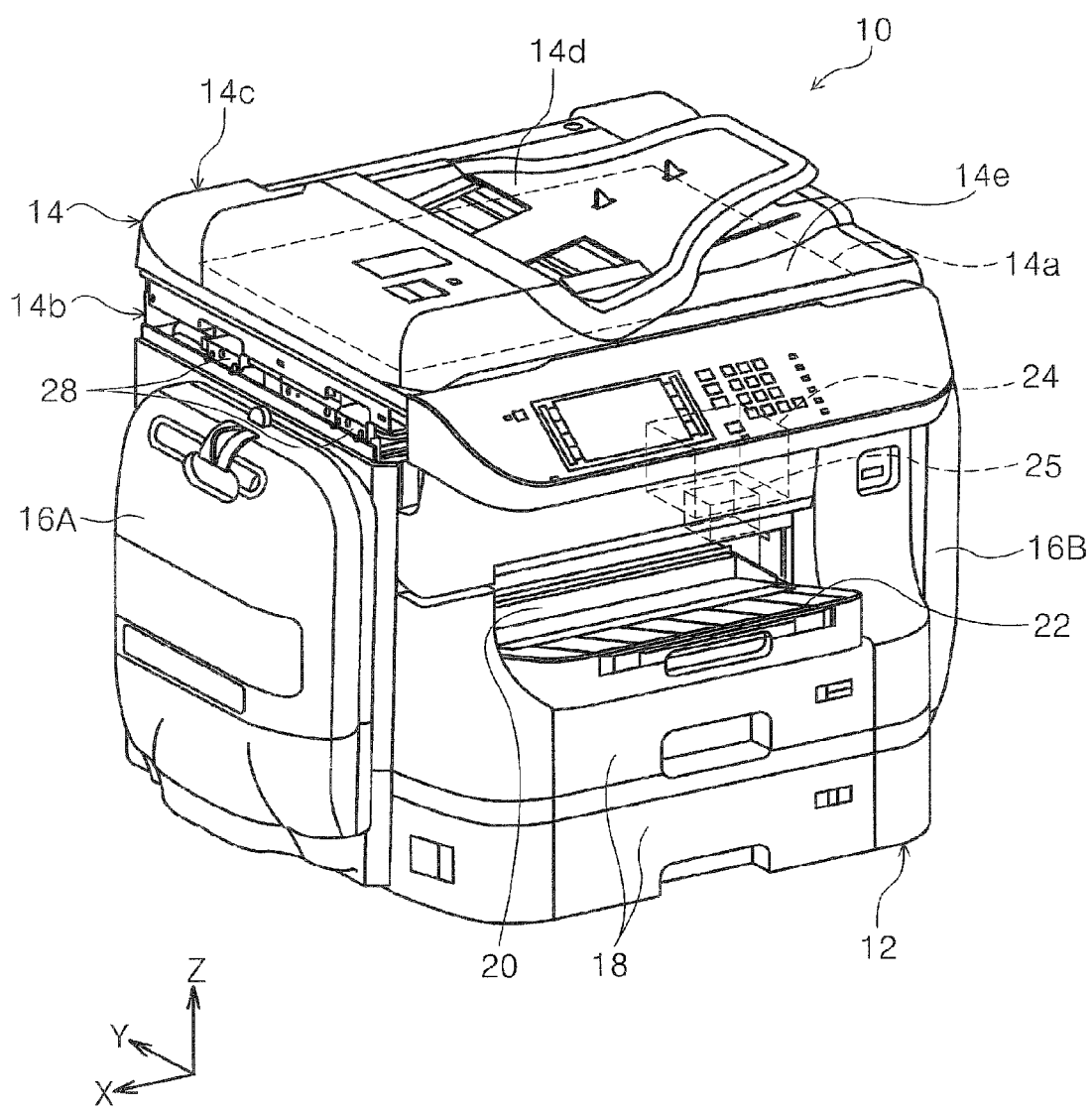
FIG. 2 is a perspective view illustrating a state in which a cover member on a left side surface is detached from the printer.
Figure 3:
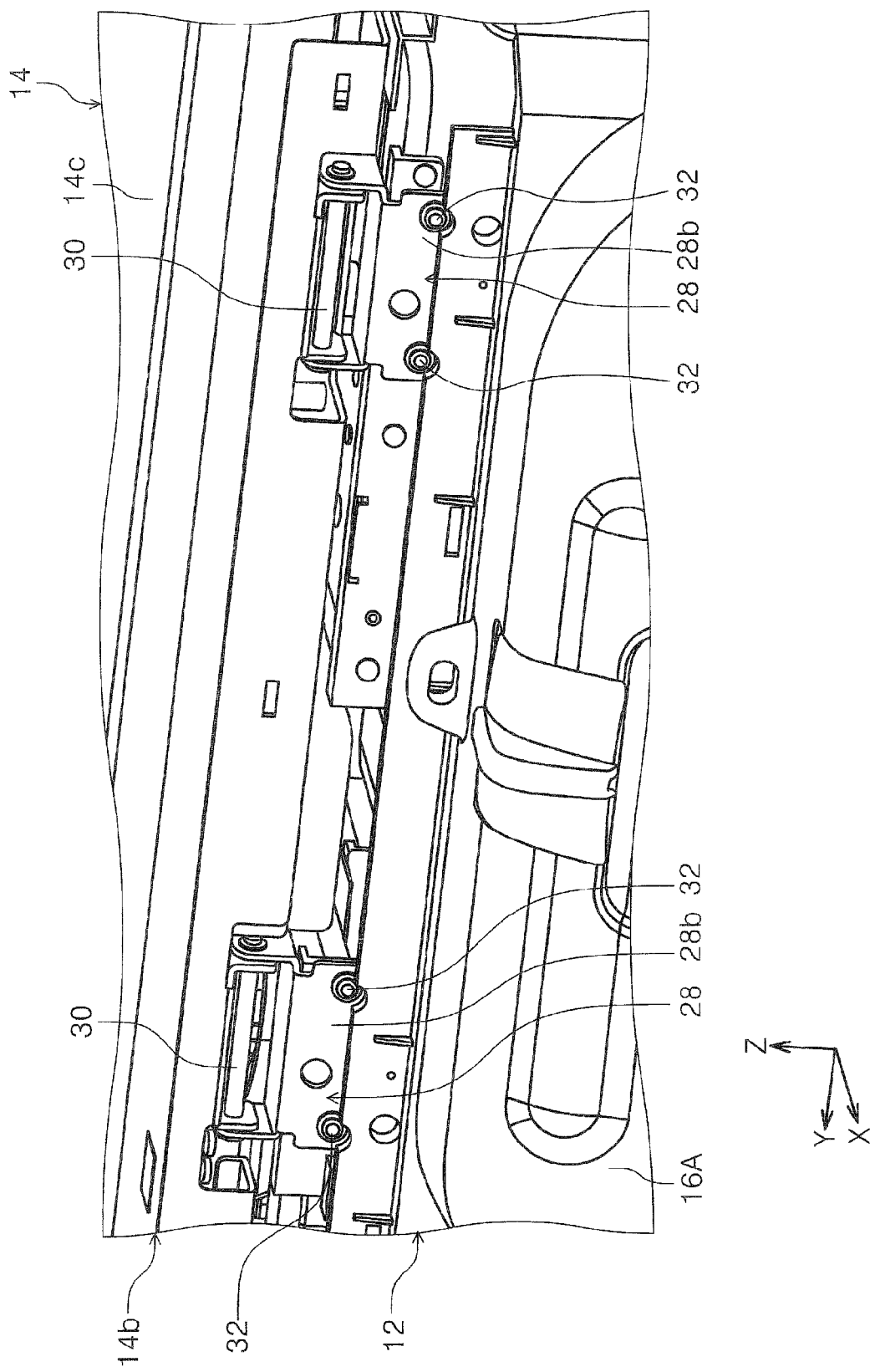
FIG. 3 is an enlarged view of a portion in which the cover member is detached in FIG. 2.
Figure 4:
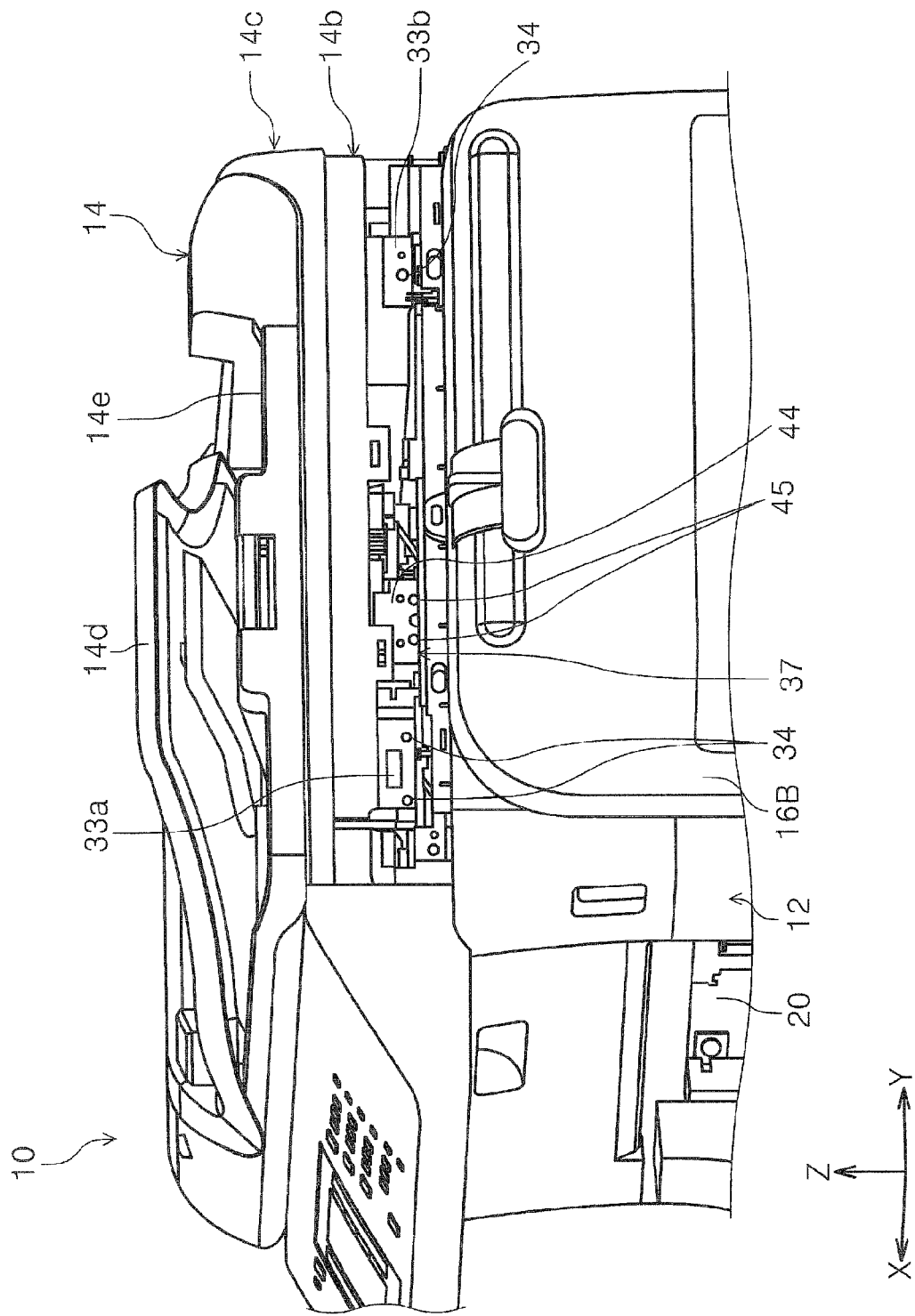
FIG. 4 is a perspective view illustrating a state in which a cover member on a right side surface is detached from the printer.
Figure 5:
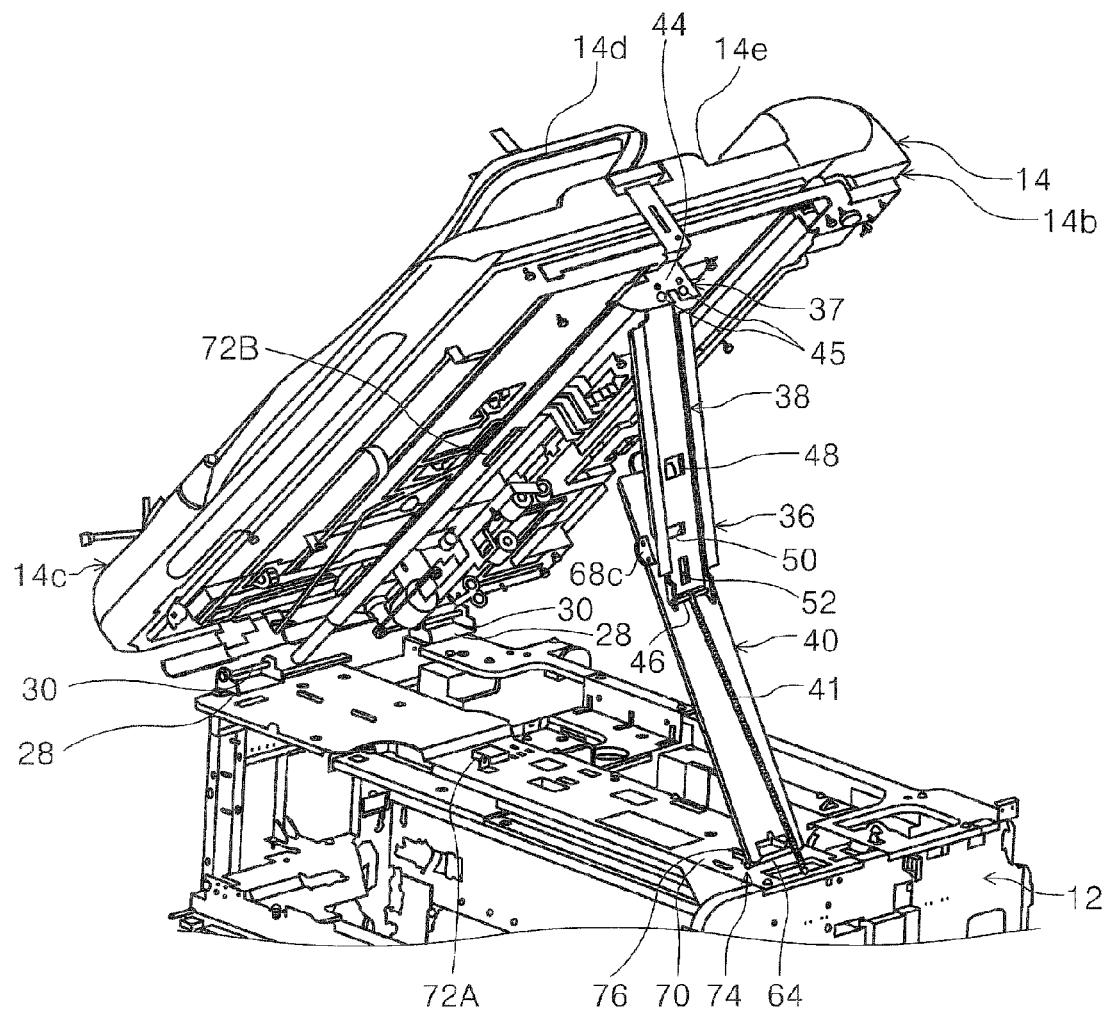
FIG. 5 is a perspective view illustrating a state in which a first link portion and a second link portion have an unfolded angle $\alpha$ therebetween when a scanner unit is caused to rotate with respect to a recording mechanism unit.
Figure 6:
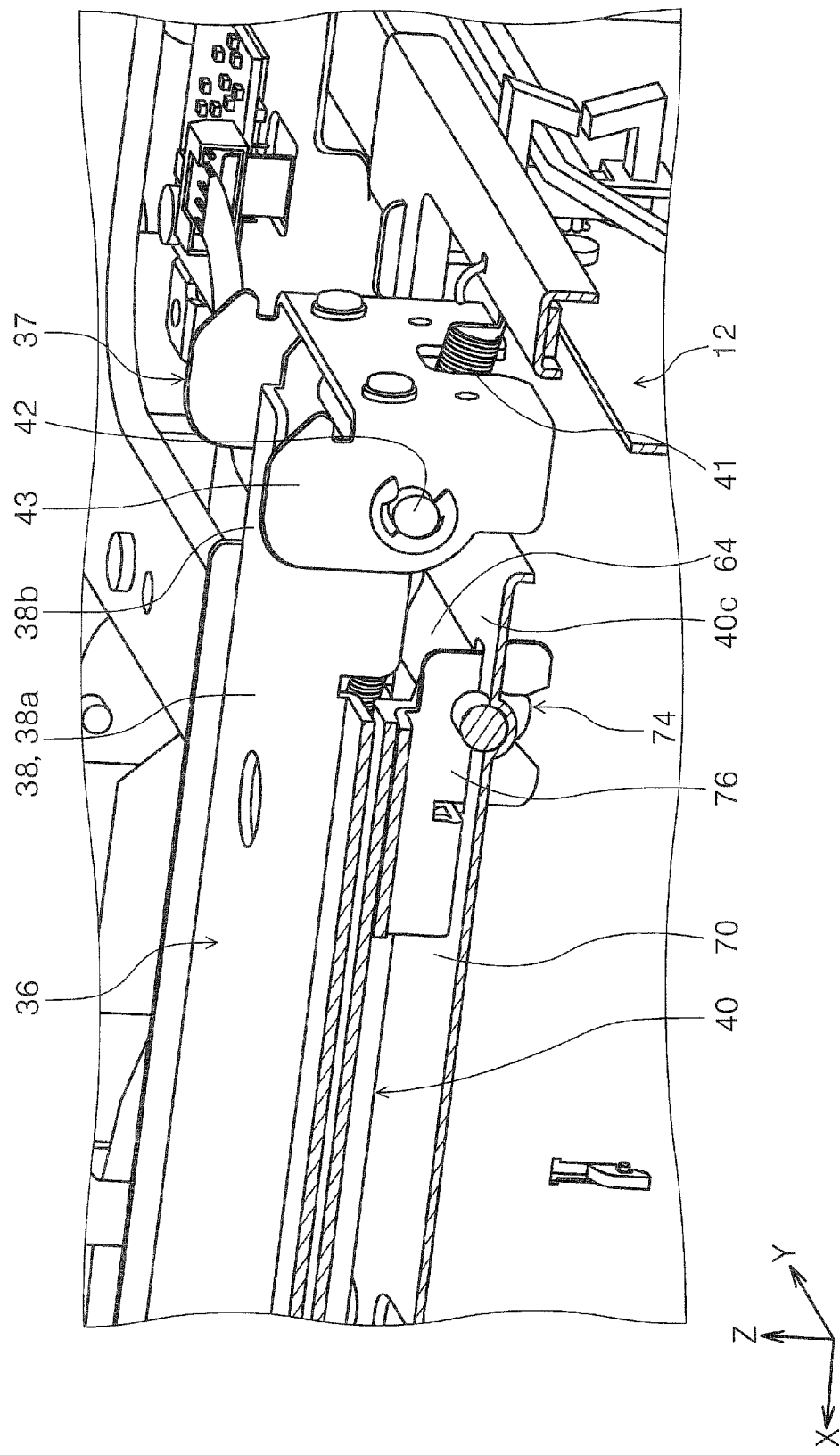
FIG. 6 is a perspective view illustrating an attachment side of a support member to the recording mechanism unit.
Figure 7:
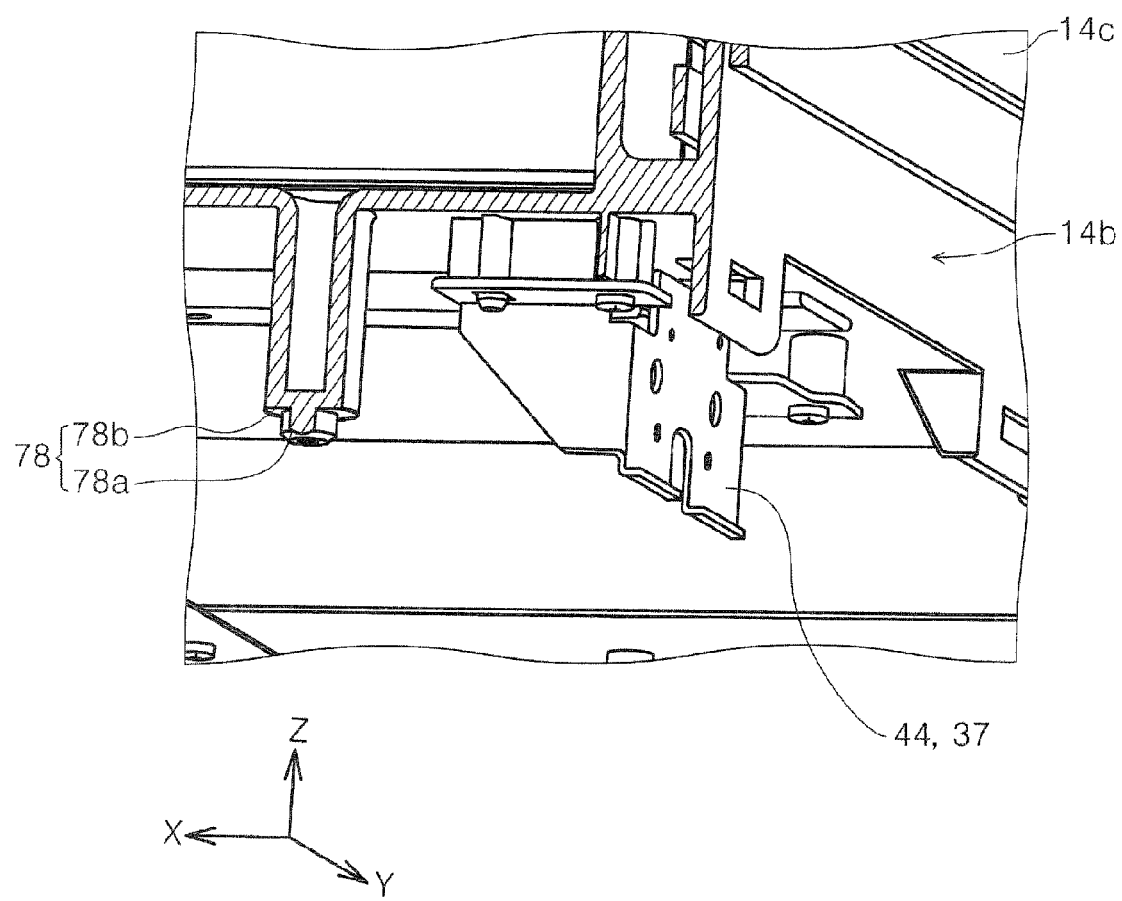
FIG. 7 is a perspective view illustrating an attachment portion of the scanner unit to which the support member is attached.
Figure 8:
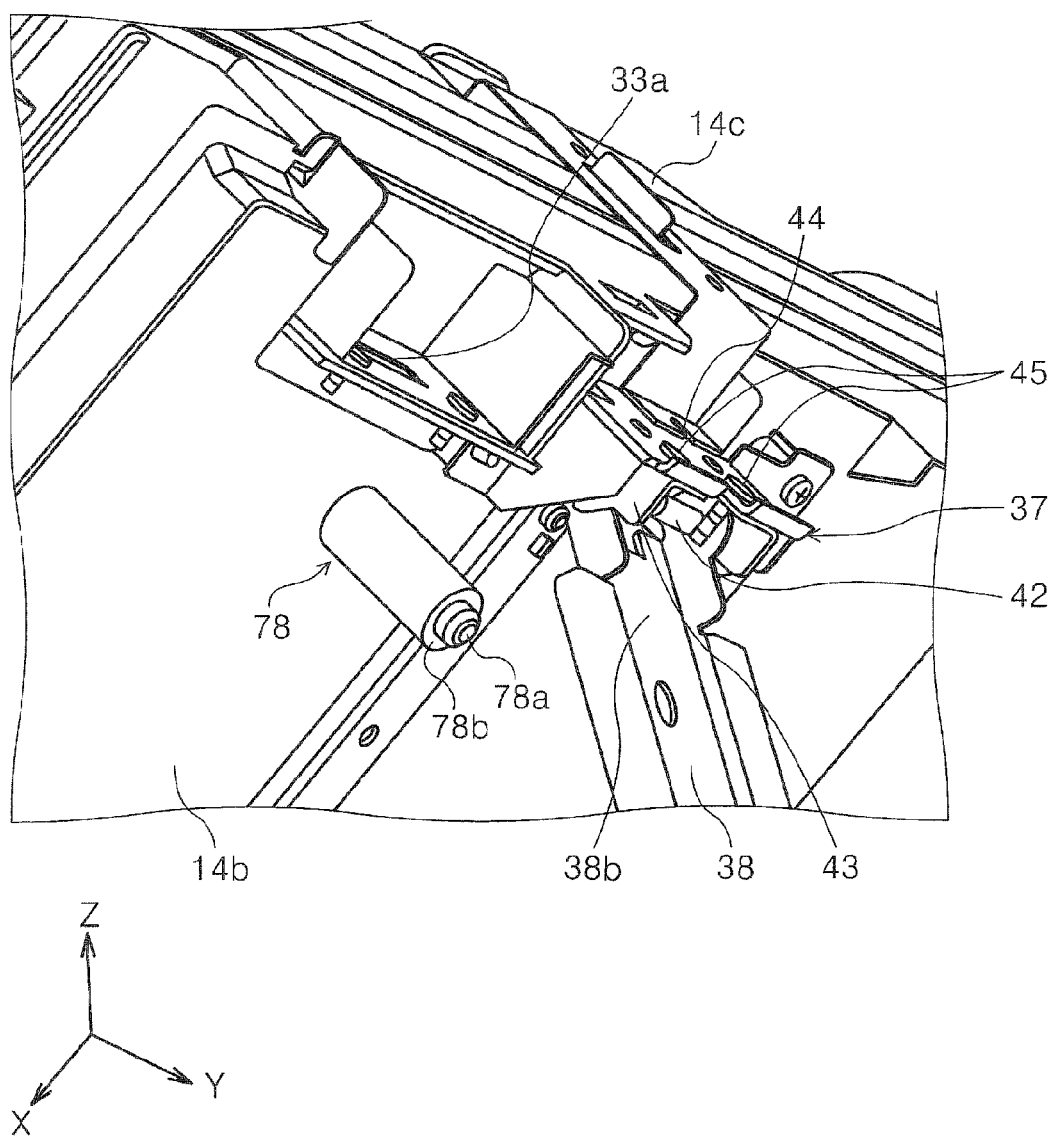
FIG. 8 is a perspective view illustrating a first connection portion in a state in which the scanner unit rotates with respect to the recording mechanism unit.

FIG. 1 is a perspective view illustrating the external appearance of a printer according to the invention. FIG. 2 is a perspective view illustrating a state in which a cover member on a left side surface is detached from the printer. FIG. 3 is an enlarged view of a portion in which the cover member is detached in FIG. 2. FIG. 4 is a perspective view illustrating a state in which a cover member on a right side surface is detached from the printer. FIG. 5 is a perspective view illustrating a state in which a first link portion and a second link portion have an unfolded angle α therebetween when a scanner unit is caused to rotate with respect to a recording mechanism unit. FIG. 6 is a perspective view illustrating an attachment side of a support member to the recording mechanism unit. FIG. 7 is a perspective view illustrating an attachment portion of the scanner unit to which the support member is attached. FIG. 8 is a perspective view illustrating a first connection portion in a state in which the scanner unit is caused to rotate with respect to the recording mechanism unit.

Figure 9:
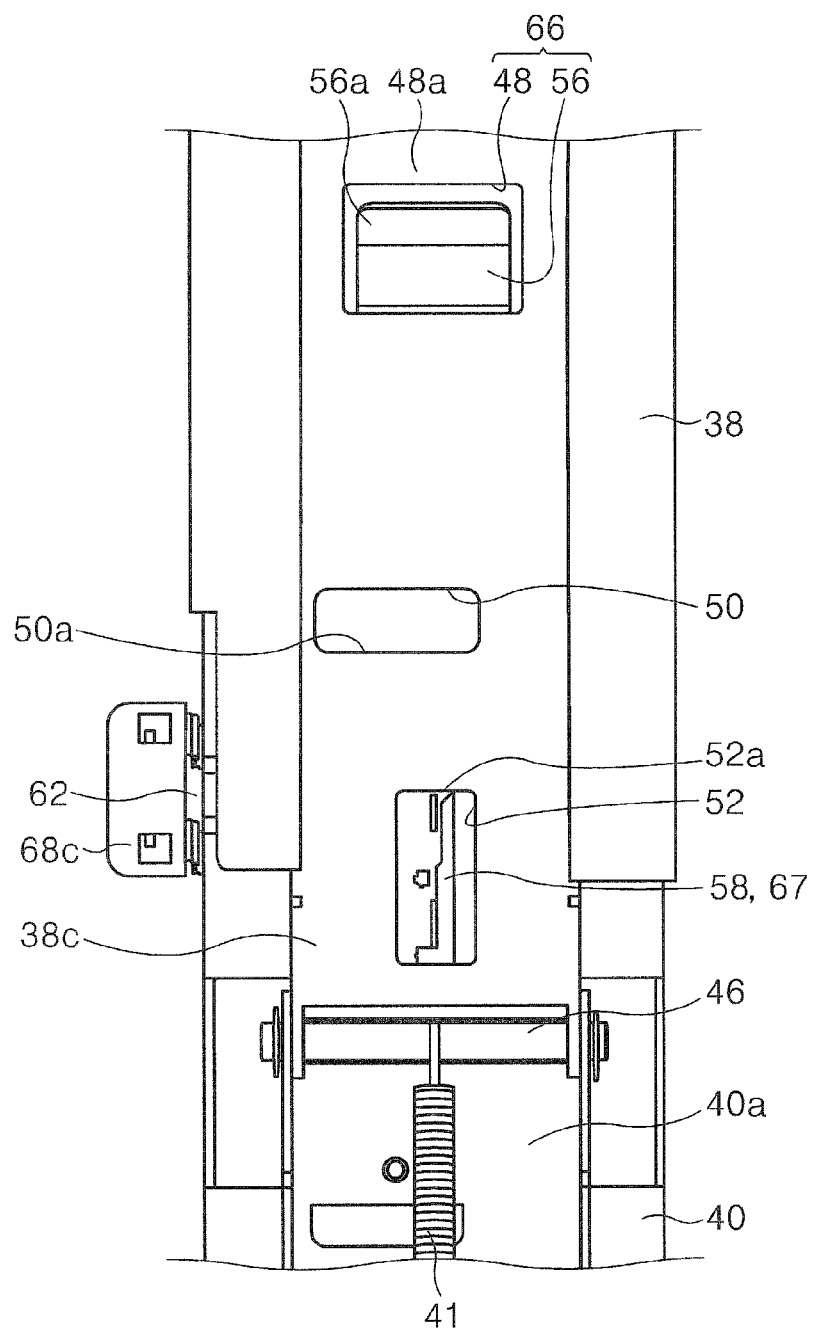
FIG. 9 is a plan view illustrating a connection portion between the first link portion and the second link portion in the support member.
Figure 10:
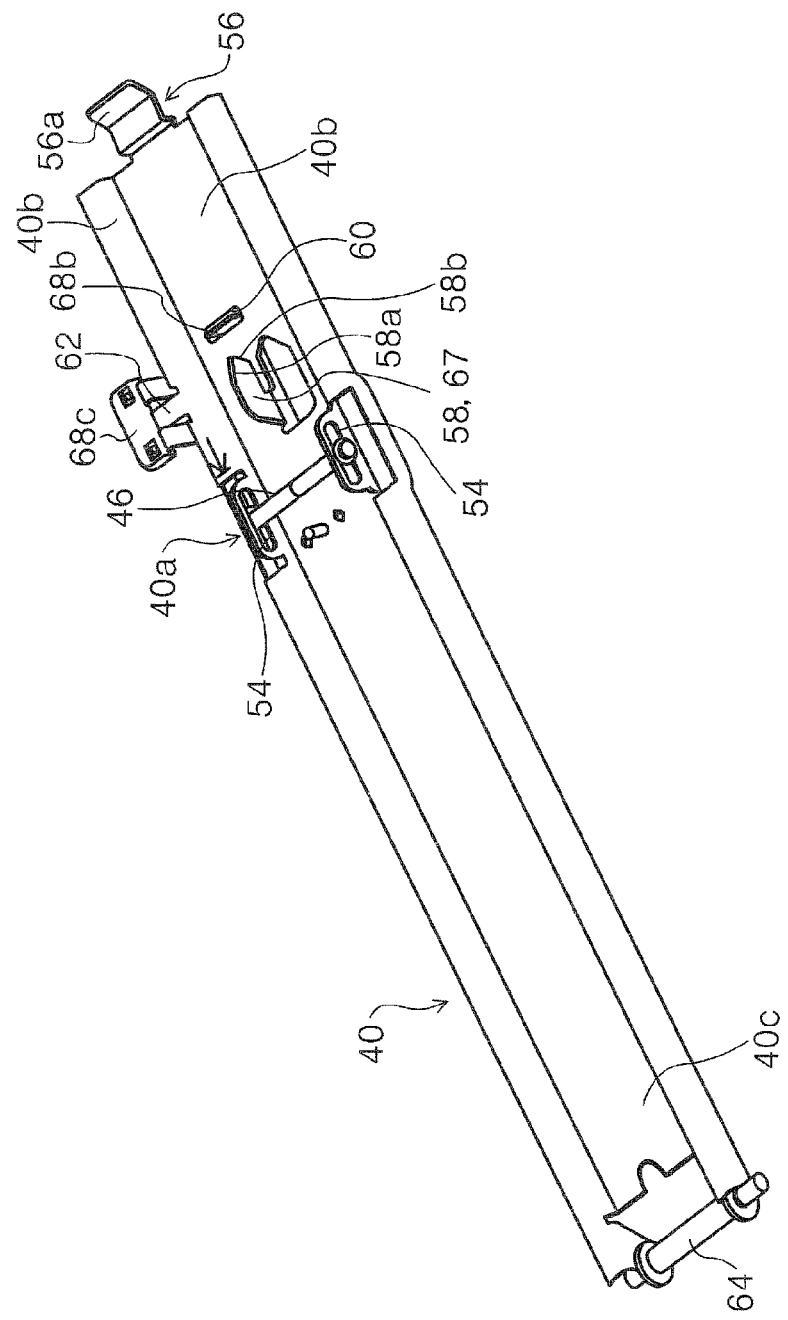
FIG. 10 is a perspective view illustrating the second link portion viewed from above.
Figure 11:
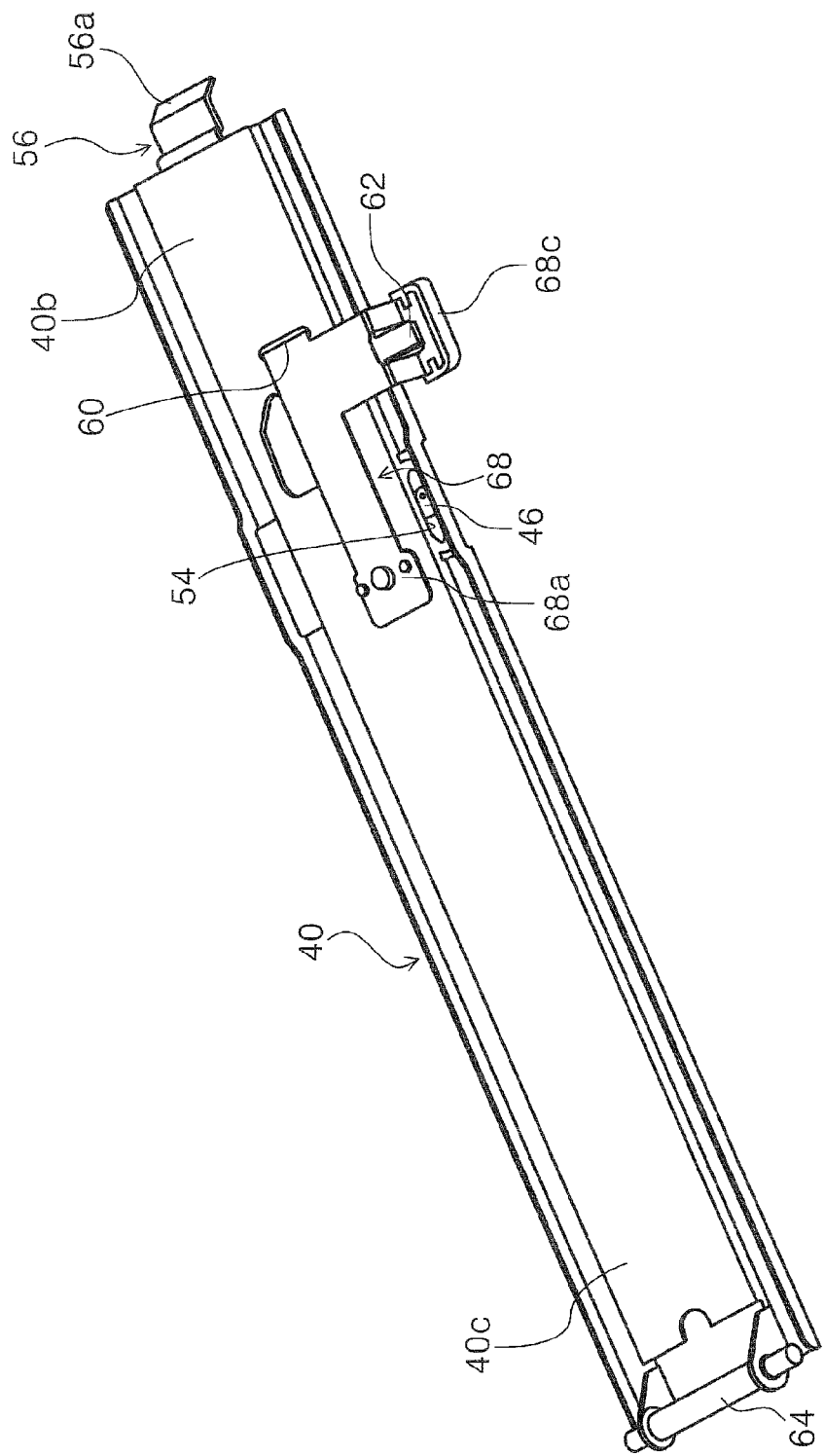
FIG. 11 is a perspective view illustrating the second link portion viewed from below.
Figure 12:
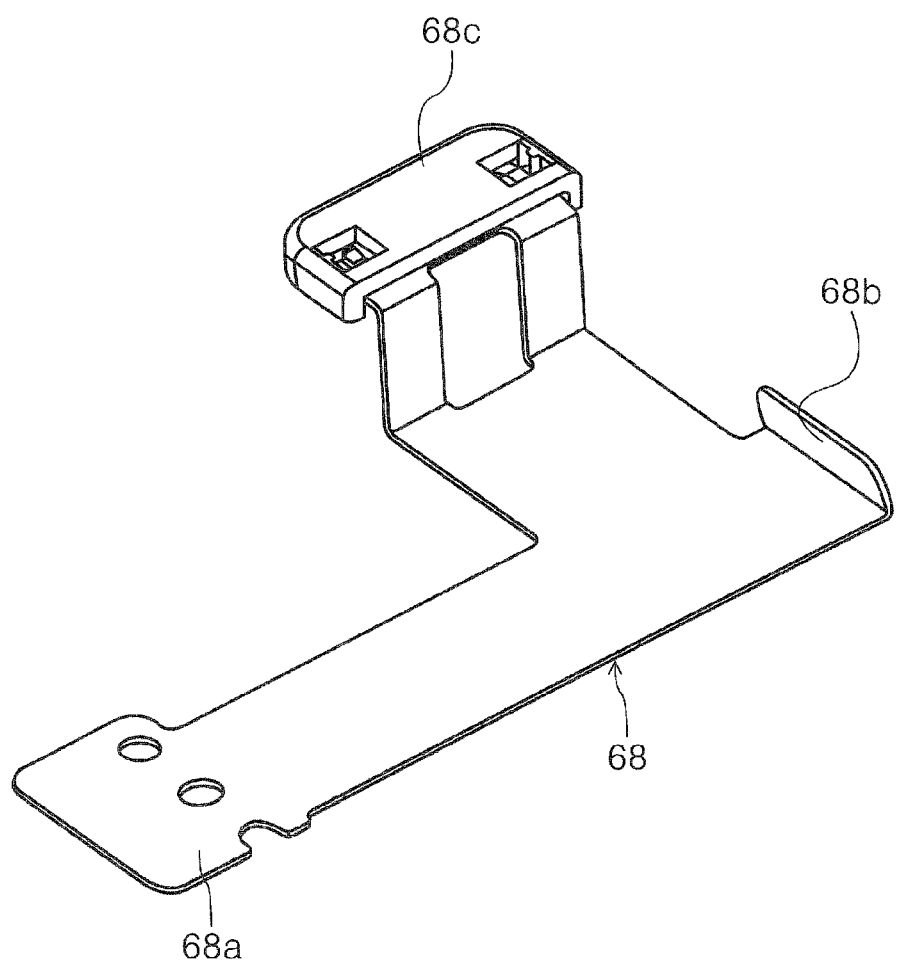
FIG. 12 is a perspective view illustrating a release regulating unit that is attached to the second link portion.
Figure 13:
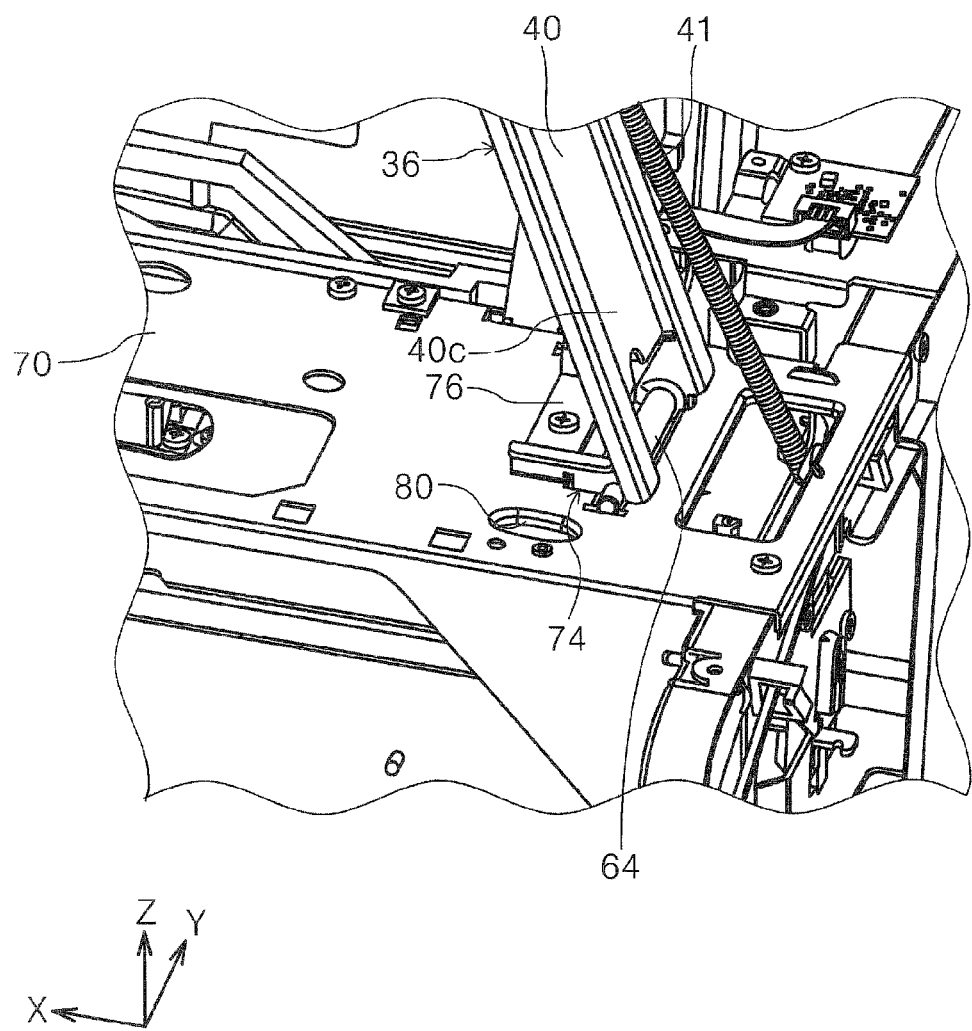
FIG. 13 is a perspective view illustrating a second connection portion in the recording mechanism unit.
Figure 14:
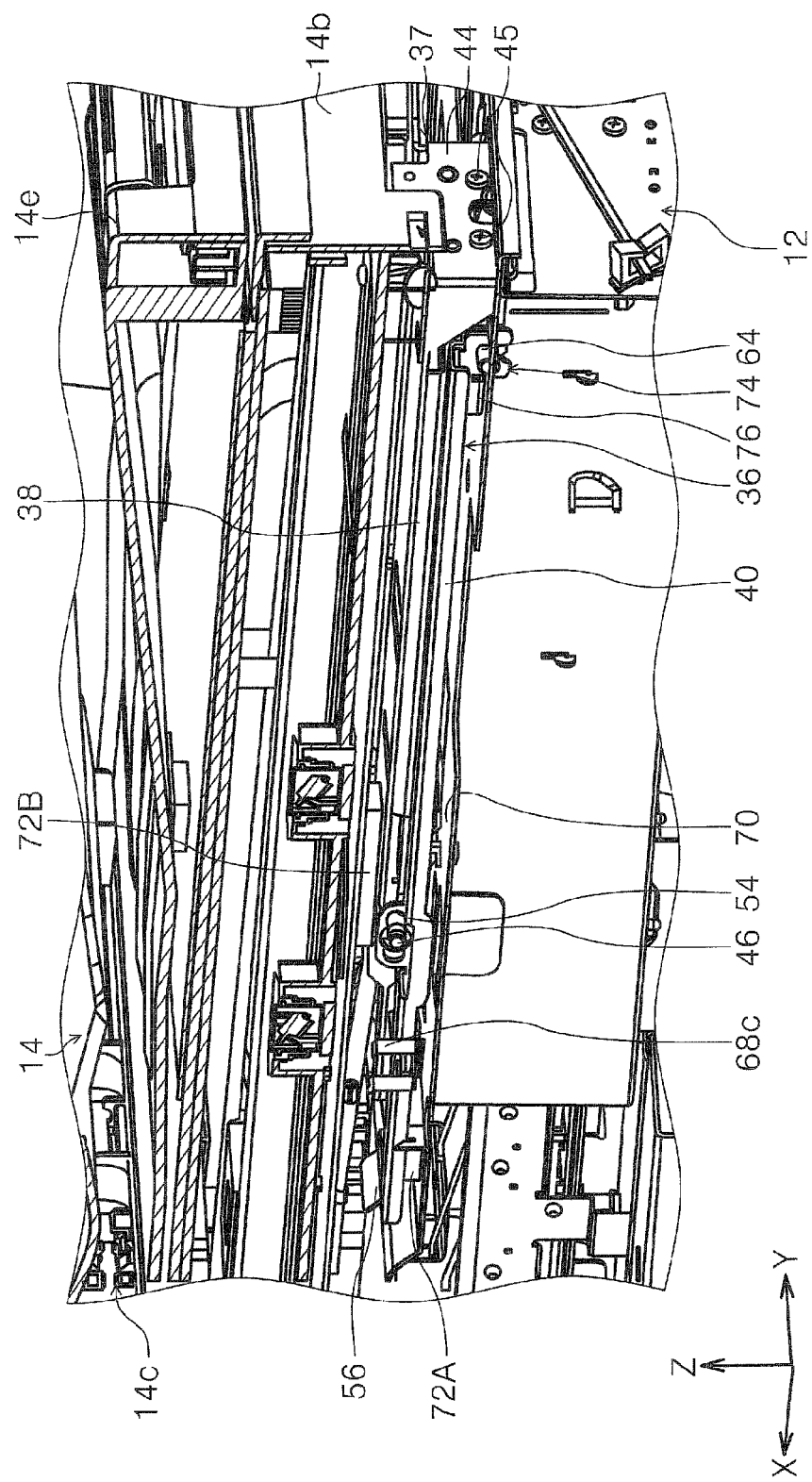
FIG. 14 is a perspective view illustrating a state of the support member when the scanner unit has a closing posture with respective to the recording mechanism unit.
Figure 15:
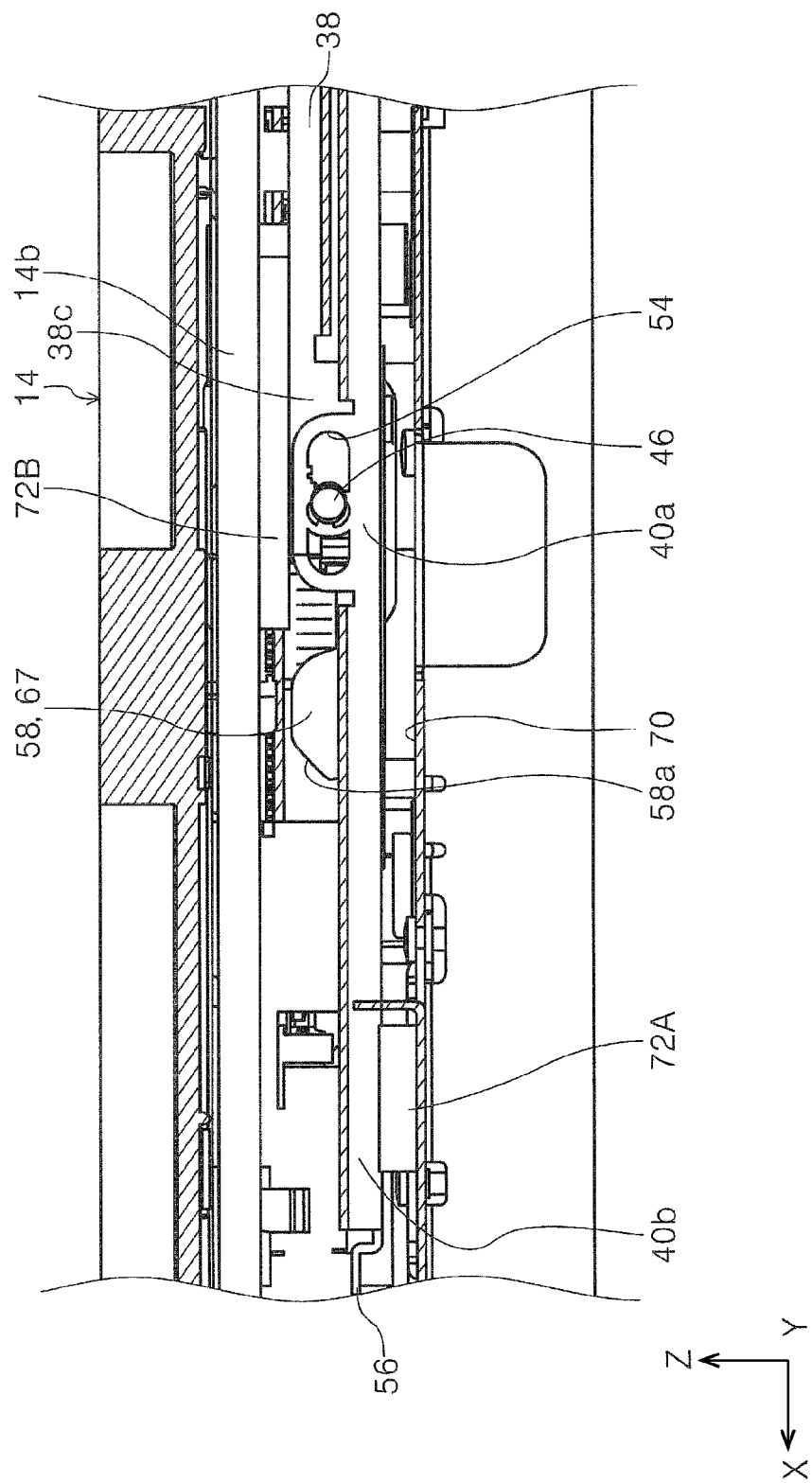
FIG. 15 is a sectional side view illustrating the connection portion between the first link portion and the second link portion of the support member in a folded state.
Figure 16:
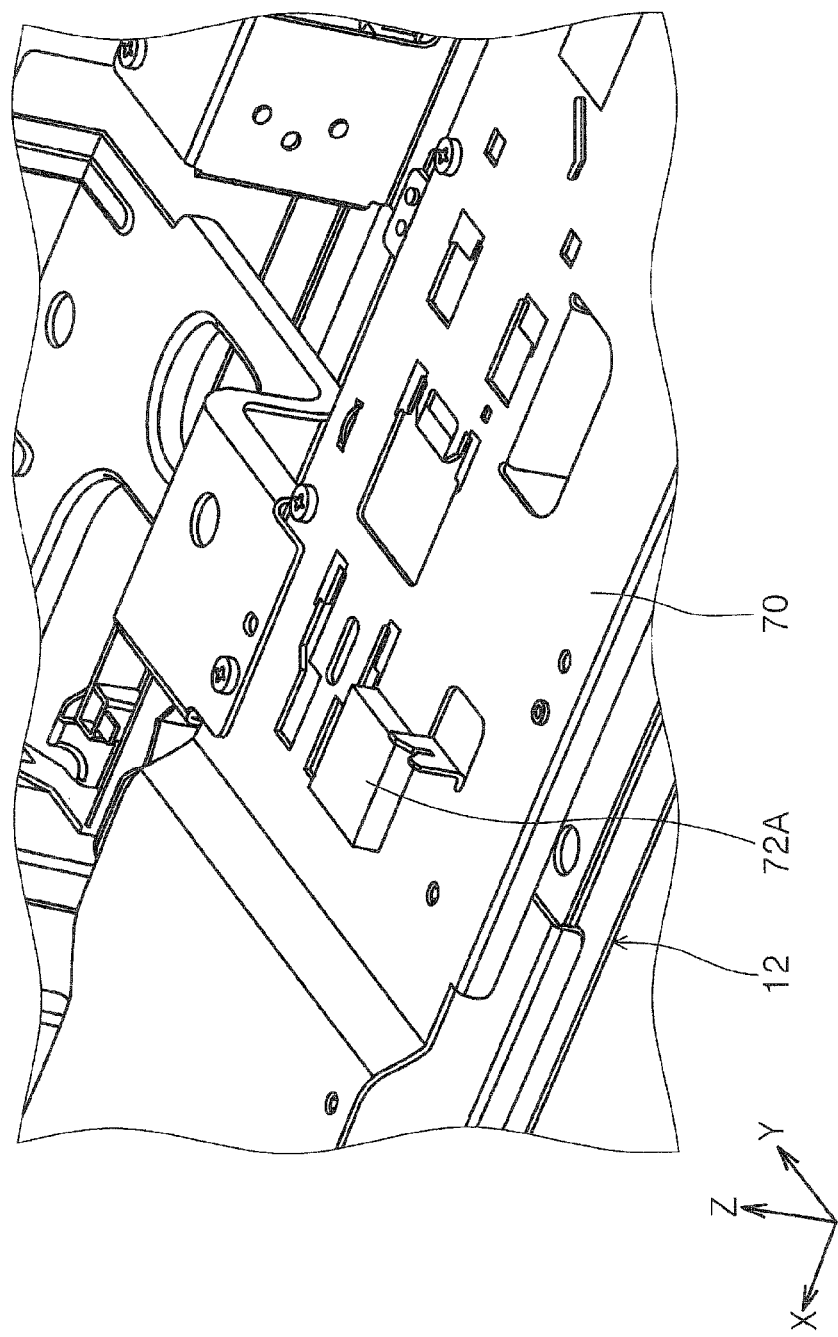
FIG. 16 is a perspective view illustrating a shock-absorbing member that comes into contact with the second link portion of the support member in the folded state in the recording mechanism unit.
Figure 17:
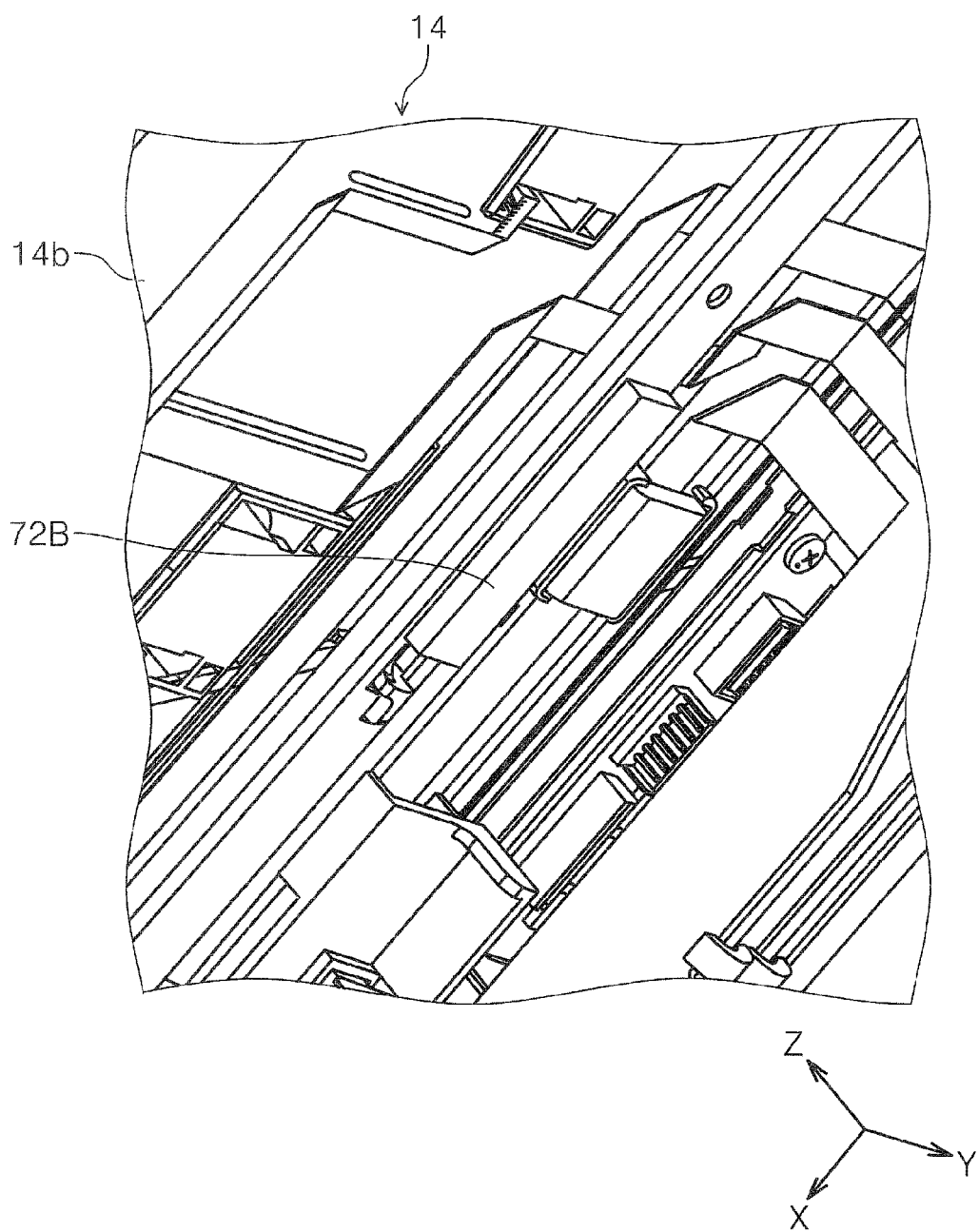
FIG. 17 is a perspective view illustrating the shock-absorbing member that comes into contact with the first link portion of the support member in the folded state in the scanner unit.
Figure 18:
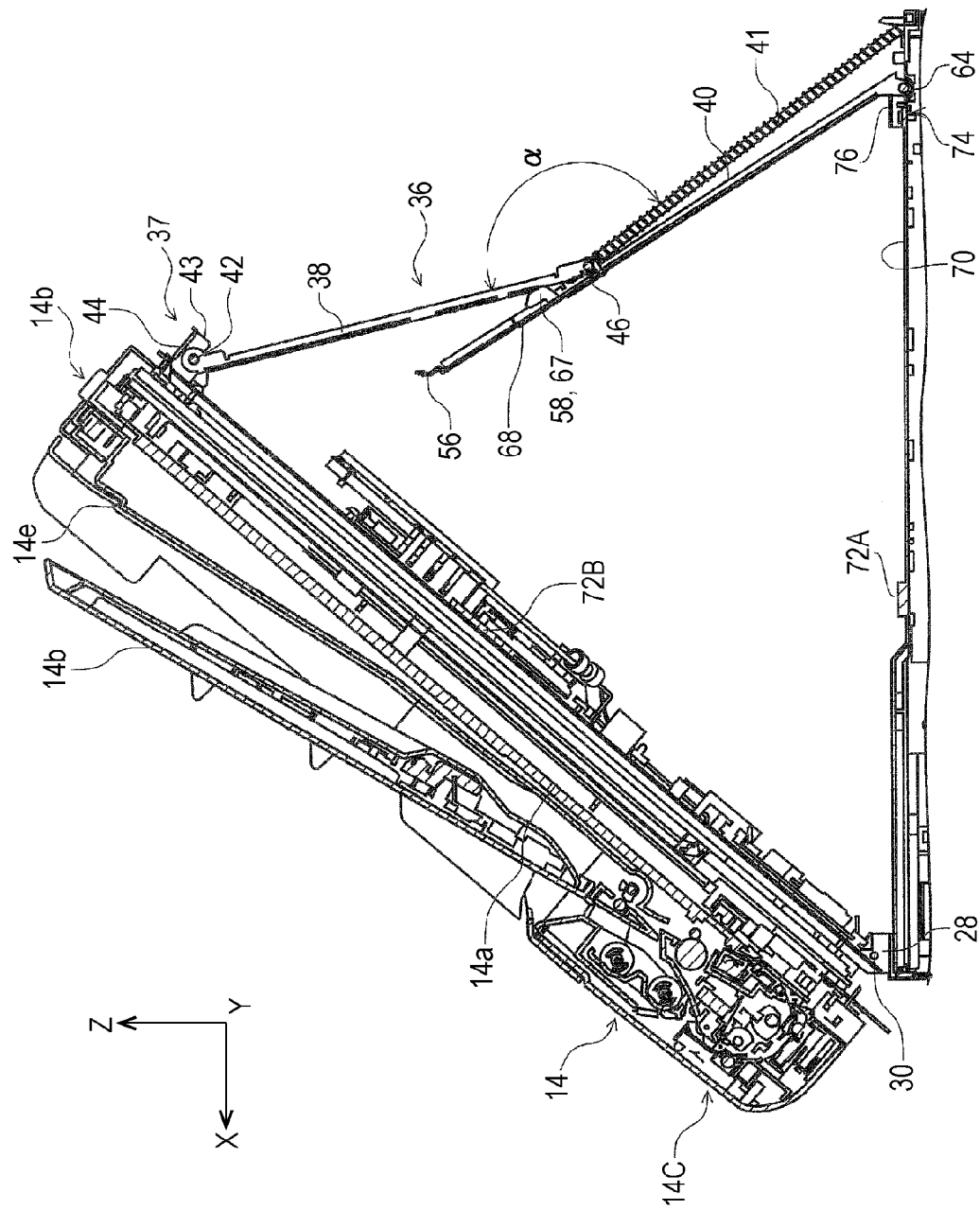
FIG. 18 is a sectional side view illustrating a state in which the first link portion and the second link portion have the unfolded angle $\alpha$ therebetween when the scanner unit is caused to rotate with respect to the recording mechanism unit.

FIG. 9 is a plan view illustrating a connection portion between the first link portion and the second link portion in the support member. FIG. 10 is a perspective view illustrating the second link portion viewed from above. FIG. 11 is a perspective view illustrating the second link portion viewed from below. FIG. 12 is a perspective view illustrating a release regulating unit that is attached to the second link portion. FIG. 13 is a perspective view illustrating a second connection portion in the recording mechanism unit. FIG. 14 is a perspective view illustrating a state of the support member when the scanner unit has a closing posture with respective to the recording mechanism unit. FIG. 15 is a sectional side view illustrating the connection portion between the first link portion and the second link portion of the support member in a folded state. FIG. 16 is a perspective view illustrating a shock-absorbing member that comes into contact with the second link portion of the support member in the folded state in the recording mechanism unit. FIG. 17 is a perspective view illustrating the shock-absorbing member that comes into contact with the first link portion of the support member in the folded state in the scanner unit. FIG. 18 is a sectional side view illustrating a state in which the first link portion and the second link portion have the unfolded angle α therebetween when the scanner unit is caused to rotate with respect to the recording mechanism unit.

Figure 19:
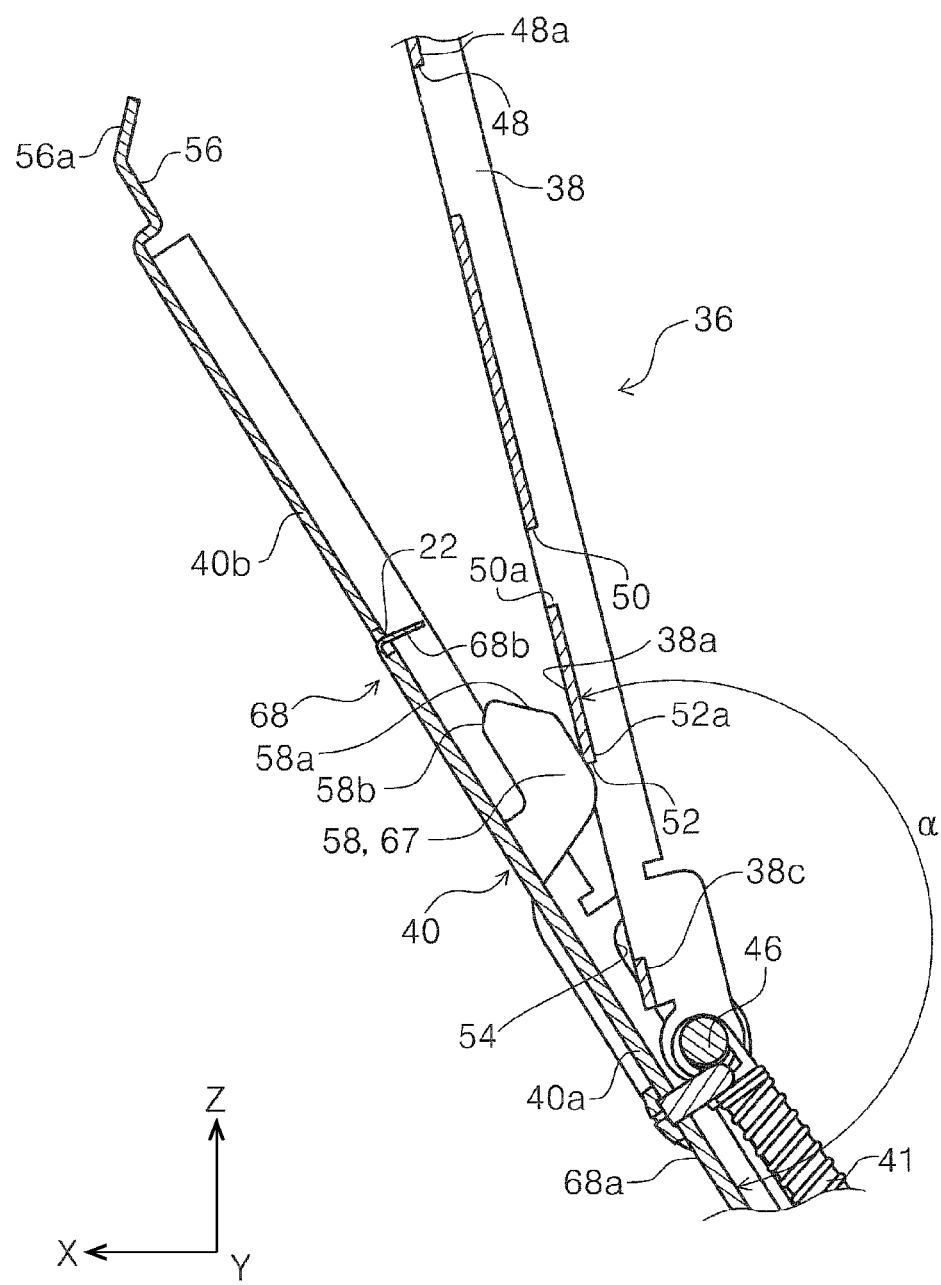
FIG. 19 is a sectional side view illustrating the connection portion between the first link portion and the second link portion in the state of having the unfolded angle α therebetween.
Figure 20:
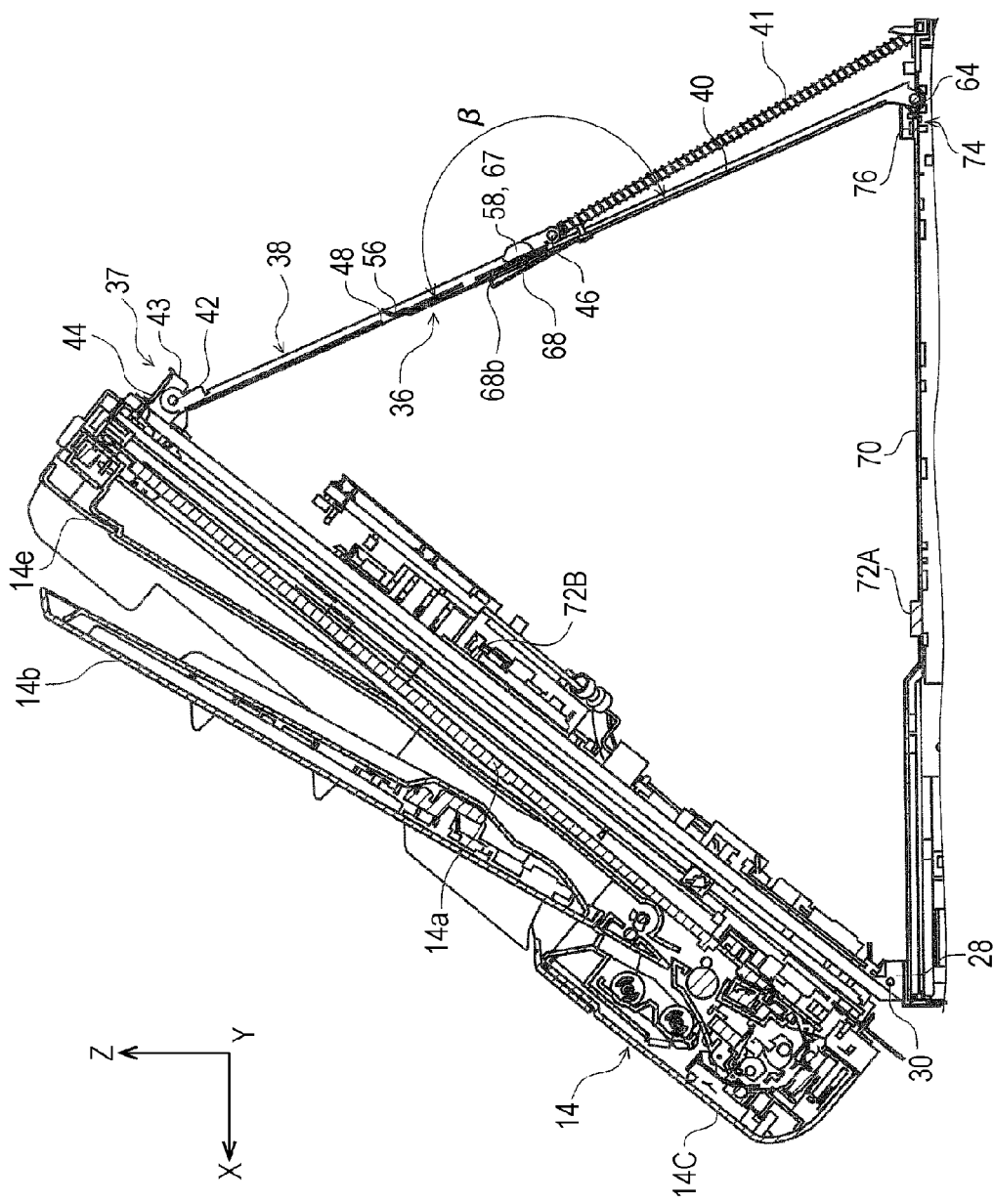
FIG. 20 is a sectional side view illustrating a state in which the first link portion and the second link portion have an unfolded angle β therebetween when the scanner unit is caused to rotate with respect to the recording mechanism unit.
Figure 21:
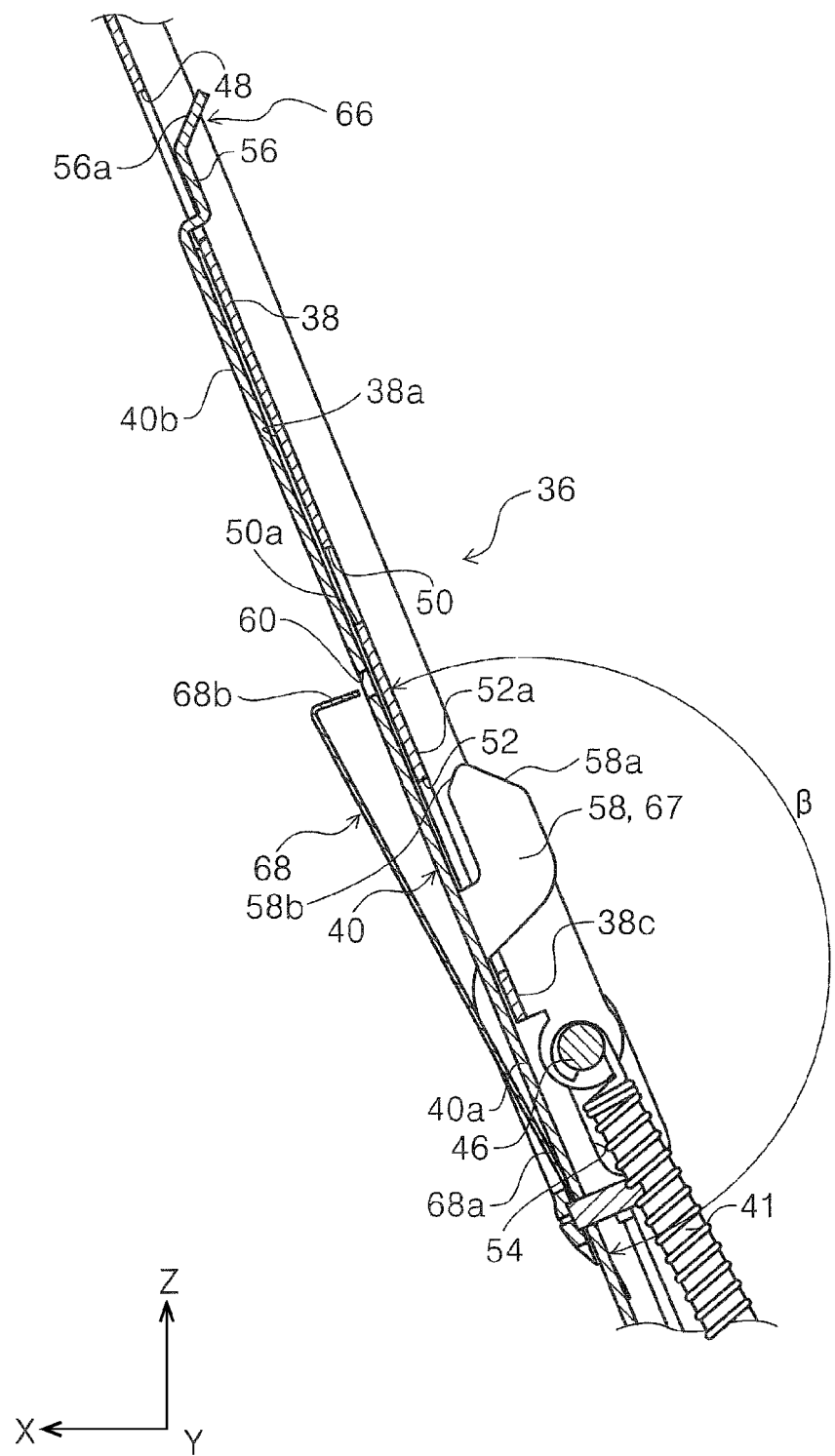
FIG. 21 is a sectional side view illustrating the connection portion between the first link portion and the second link portion in the state of having the unfolded angle β.
Figure 22:
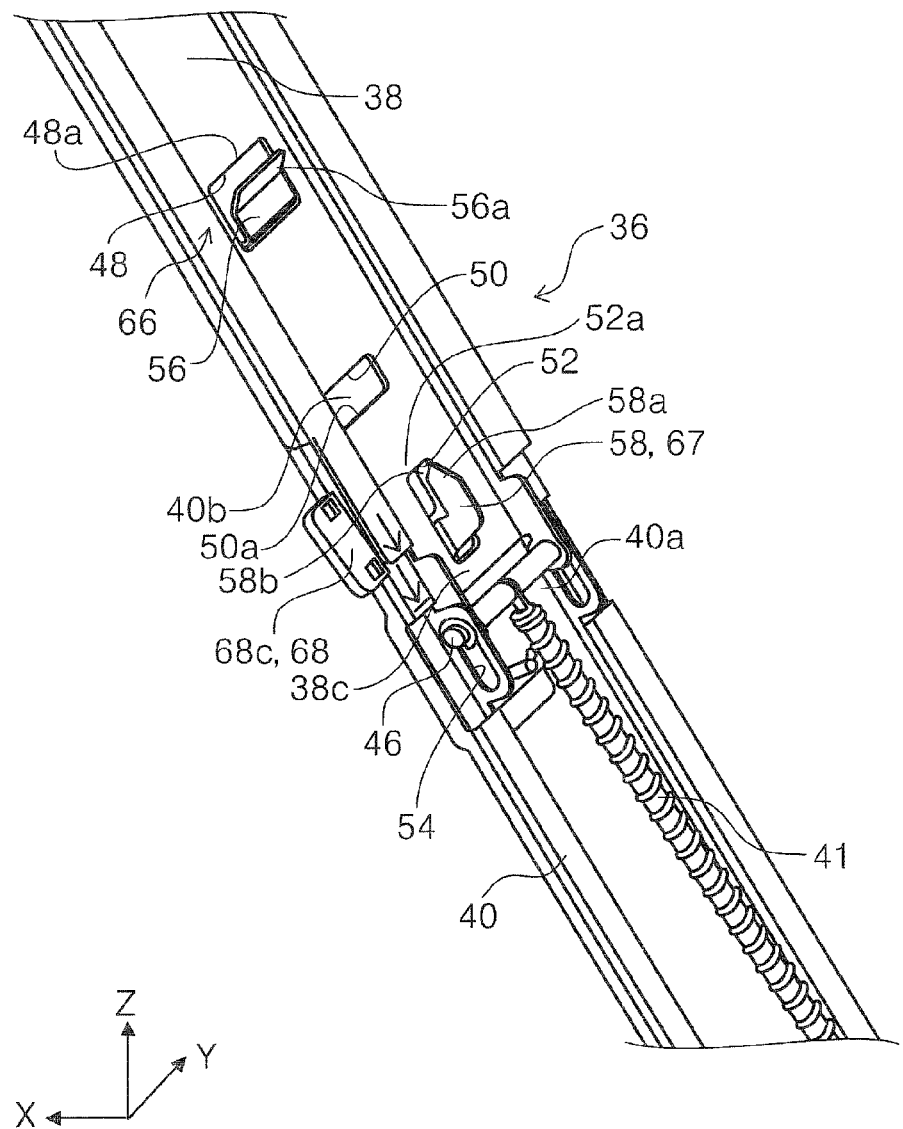
FIG. 22 is a perspective view illustrating a first locking mechanism and a second locking mechanism in the first link portion and the second link portion which are in a state of having the unfolded angle β.
Figure 23:
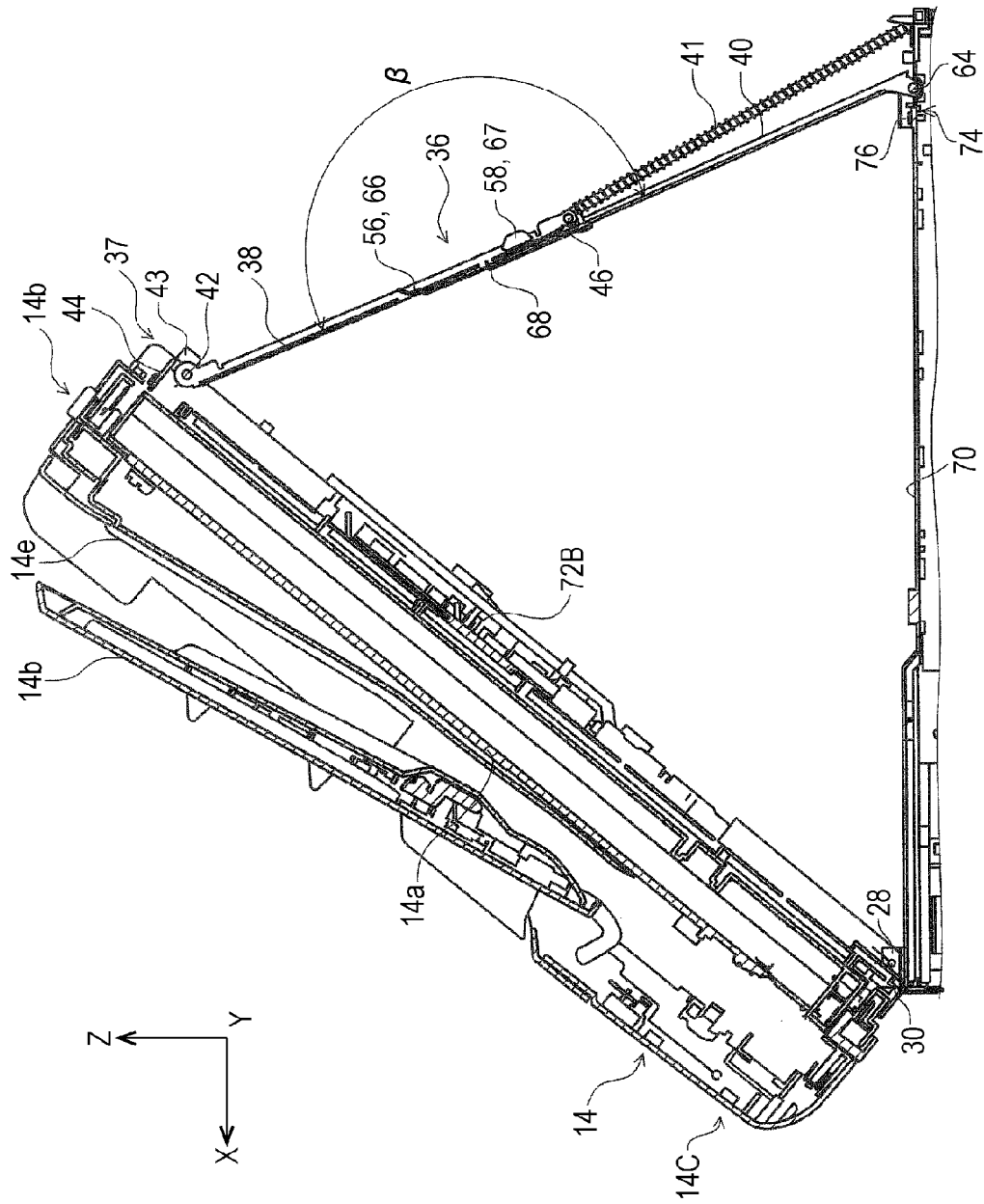
FIG. 23 is a sectional side view illustrating a state in which the first locking mechanism locks a relative rotation of the first link portion and the second link portion.
Figure 24:
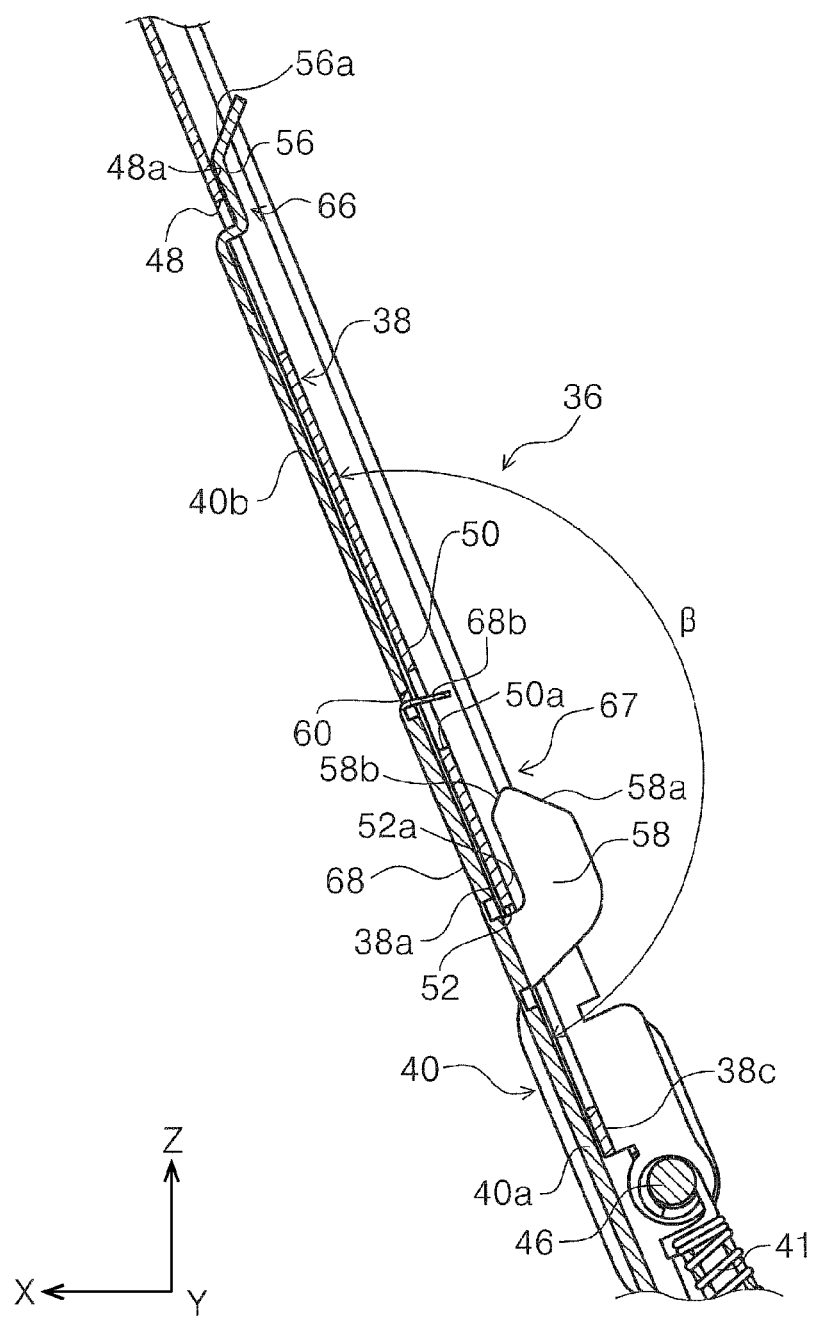
FIG. 24 is a sectional side view illustrating the connection portion between the first link portion and the second link portion in the state in which the first locking mechanism locks the relative rotation of the first link portion and the second link portion.
Figure 25:
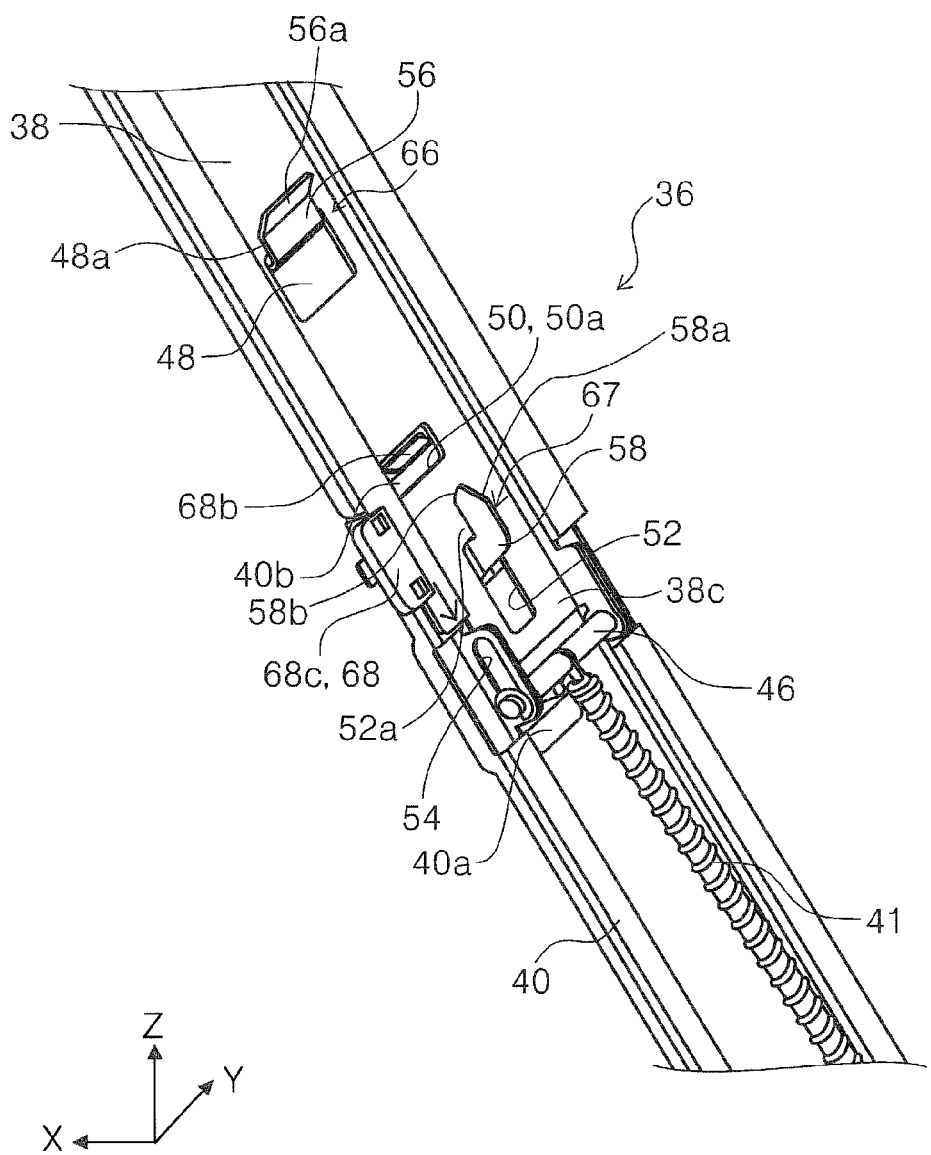
FIG. 25 is a perspective view illustrating the first locking mechanism and the second locking mechanism in the state in which the first locking mechanism locks the relative rotation of the first link portion and the second link portion.
Figure 26:
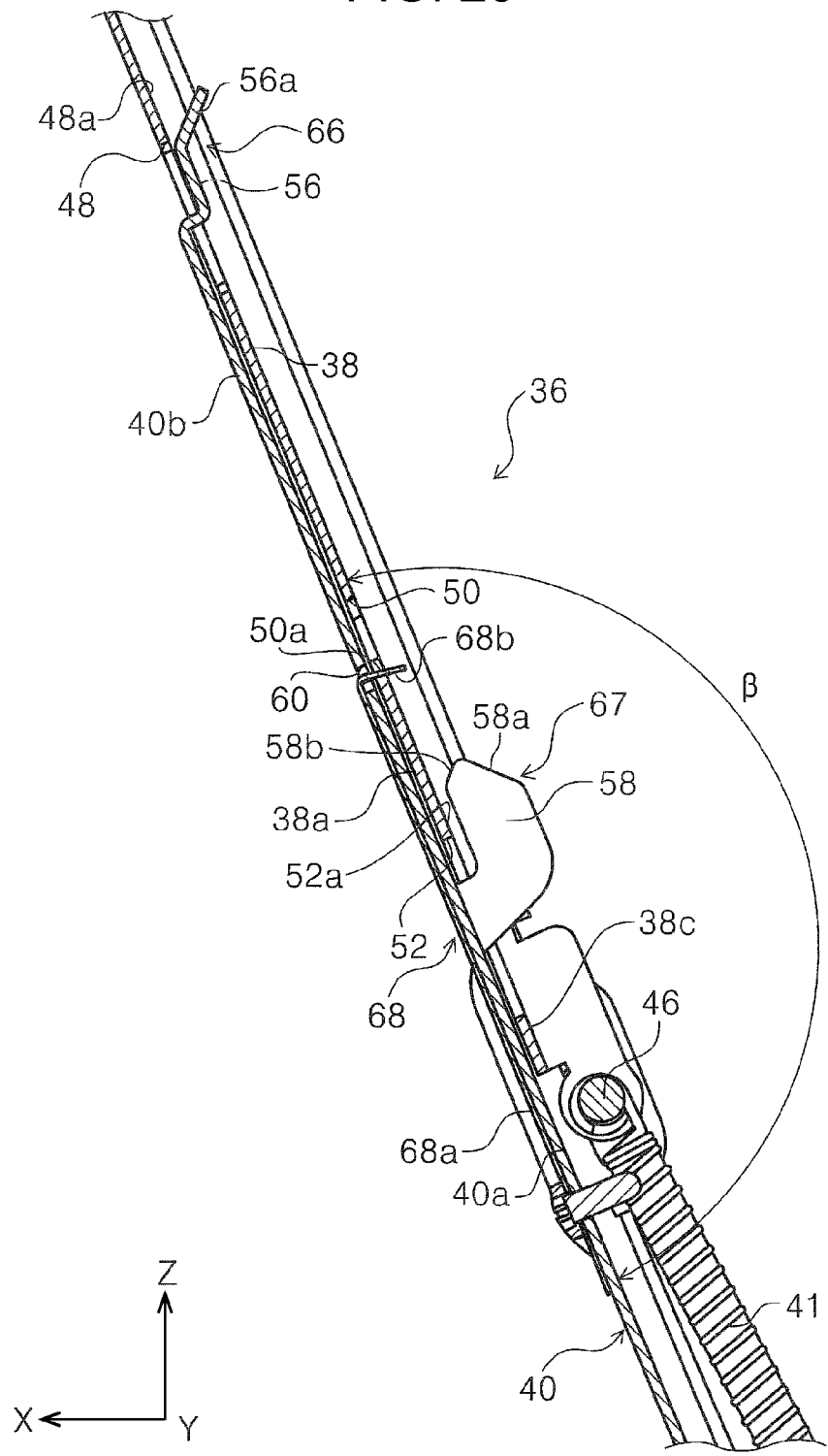
FIG. 26 is a sectional side view illustrating the first locking mechanism and the second locking mechanism in a case where the locking state of the first locking mechanism is forced to be released in a state in which the release regulating unit is in a non-release state.

FIG. 19 is a sectional side view illustrating the connection portion between the first link portion and the second link portion in the state of having the unfolded angle α therebetween. FIG. 20 is a sectional side view illustrating a state in which the first link portion and the second link portion have an unfolded angle β therebetween when the scanner unit is caused to rotate with respect to the recording mechanism unit. FIG. 21 is a sectional side view illustrating the connection portion between the first link portion and the second link portion in the state of having the unfolded angle β. FIG. 22 is a perspective view illustrating a first locking mechanism and a second locking mechanism in the first link portion and the second link portion which are in a state of having the unfolded angle β. FIG. 23 is a sectional side view illustrating a state in which the first locking mechanism locks a relative rotation of the first link portion and the second link portion. FIG. 24 is a sectional side view illustrating the connection portion between the first link portion and the second link portion in the state in which the first locking mechanism locks the relative rotation of the first link portion and the second link portion. FIG. 25 is a perspective view illustrating the first locking mechanism and the second locking mechanism in the state in which the first locking mechanism locks the relative rotation of the first link portion and the second link portion. FIG. 26 is a sectional side view illustrating the first locking mechanism and the second locking mechanism in a case where the locking state of the first locking mechanism is forced to be released in a state in which the release regulating unit is in a non-release state.

Figure 27:
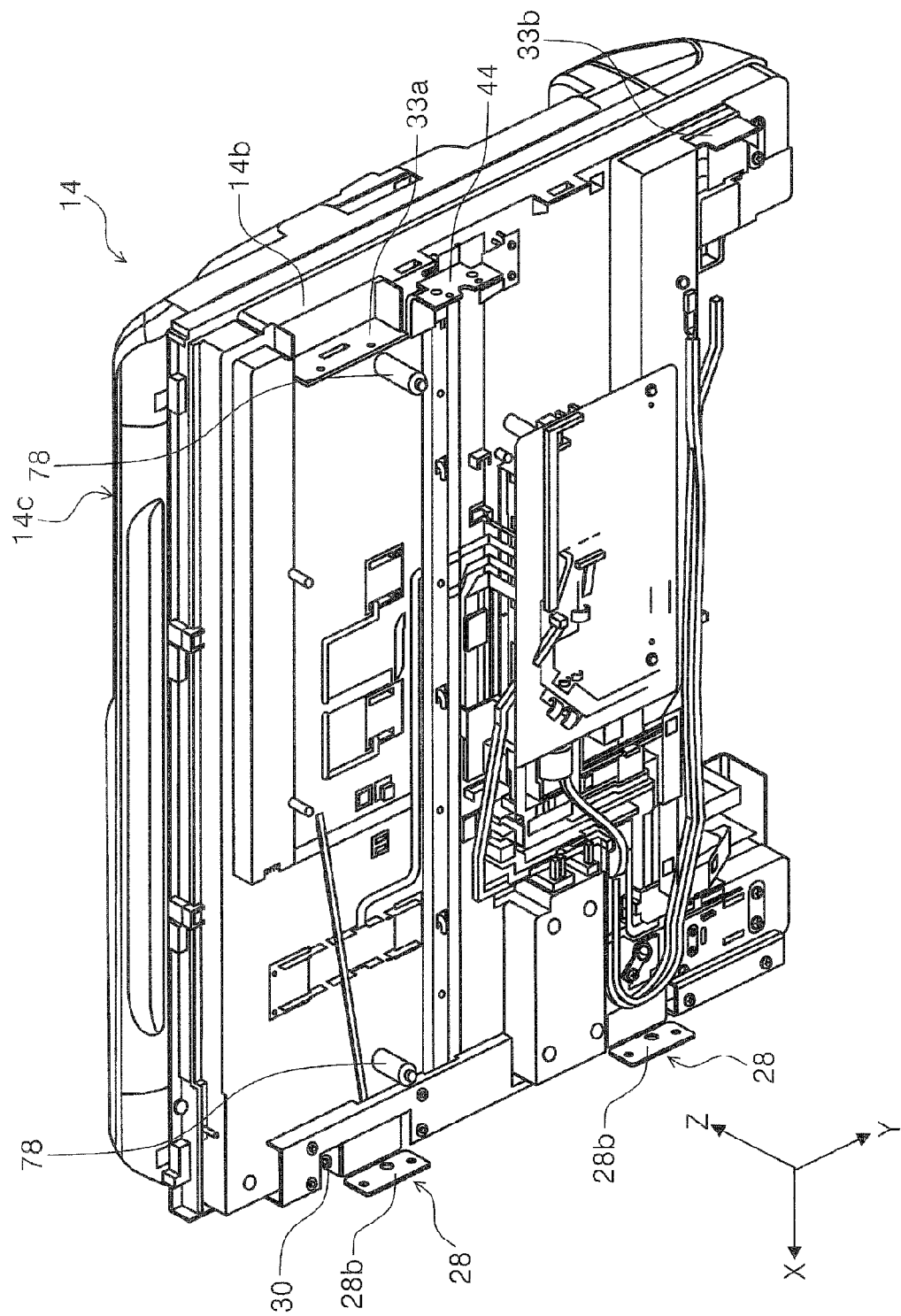
FIG. 27 is a perspective view of the scanner unit viewed from below.
Figure 28:
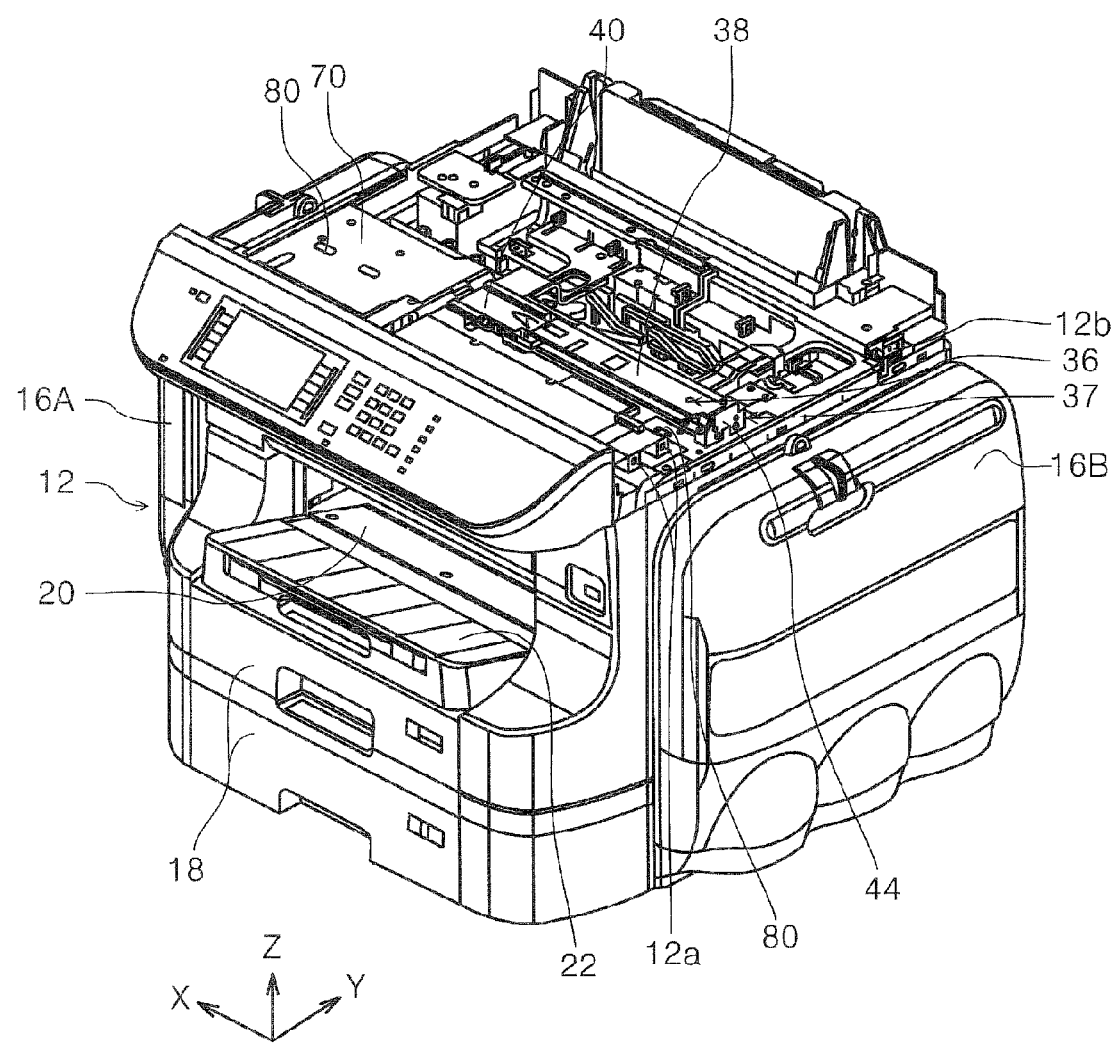
FIG. 28 is a perspective view illustrating a state in which the scanner unit is detached from the recording mechanism unit in the printer.
Figure 29:
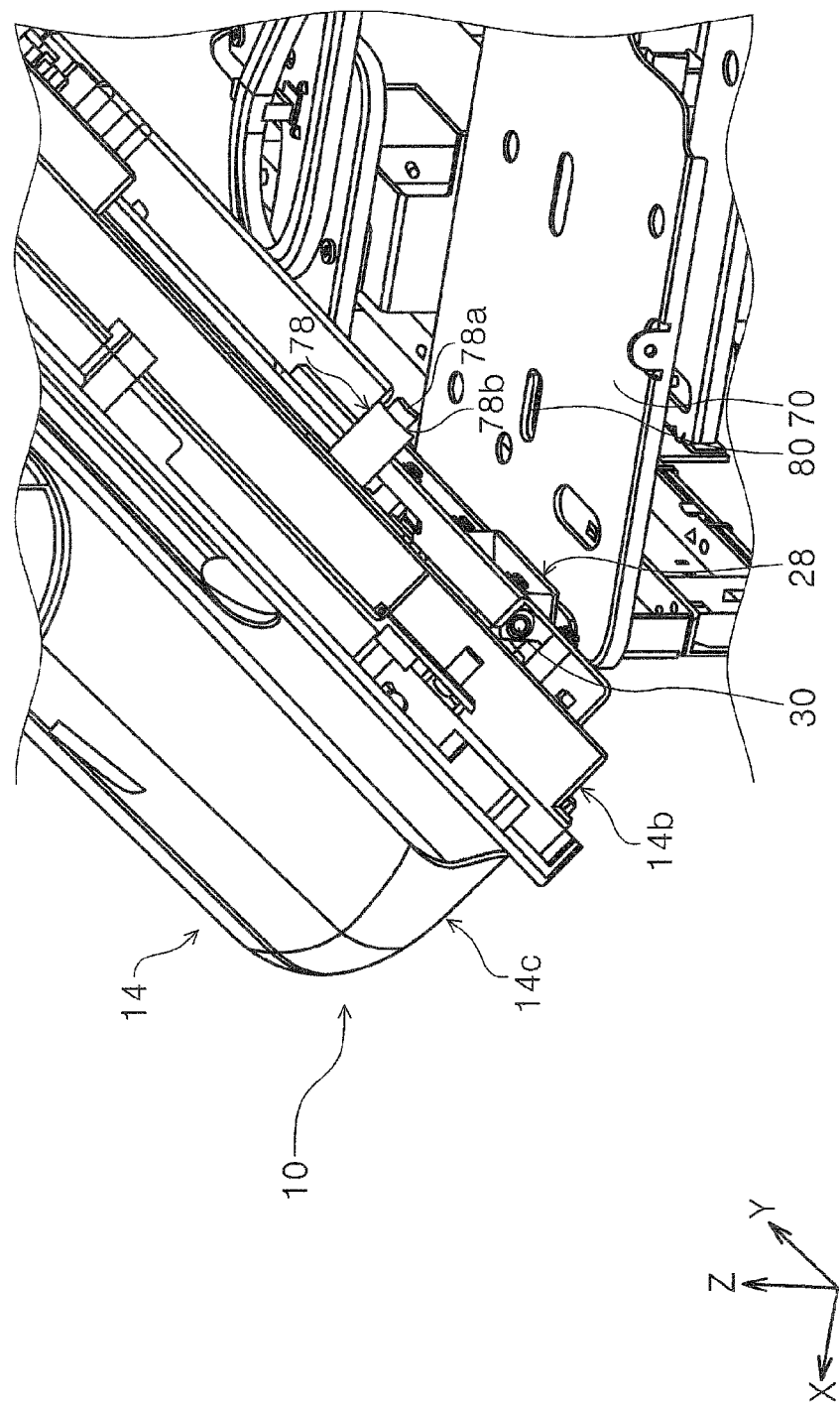
FIG. 29 is a perspective view illustrating Y-axial and Z-axial positioning portions on a rotary shaft side of the scanner unit.
Figure 30:
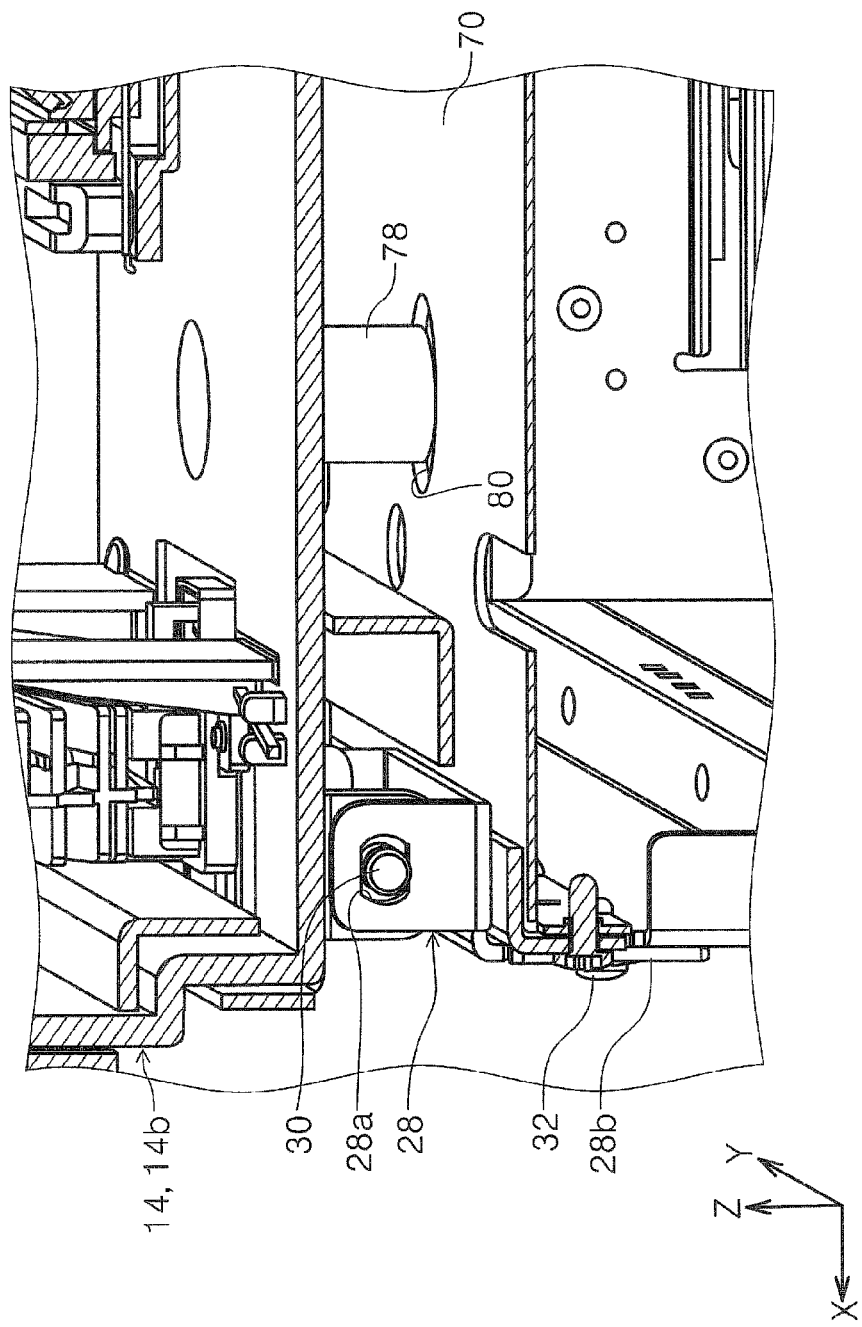
FIG. 30 is a sectional view illustrating the Y-axial and Z-axial positioning portions on the rotary shaft side of the scanner unit.
Figure 31:
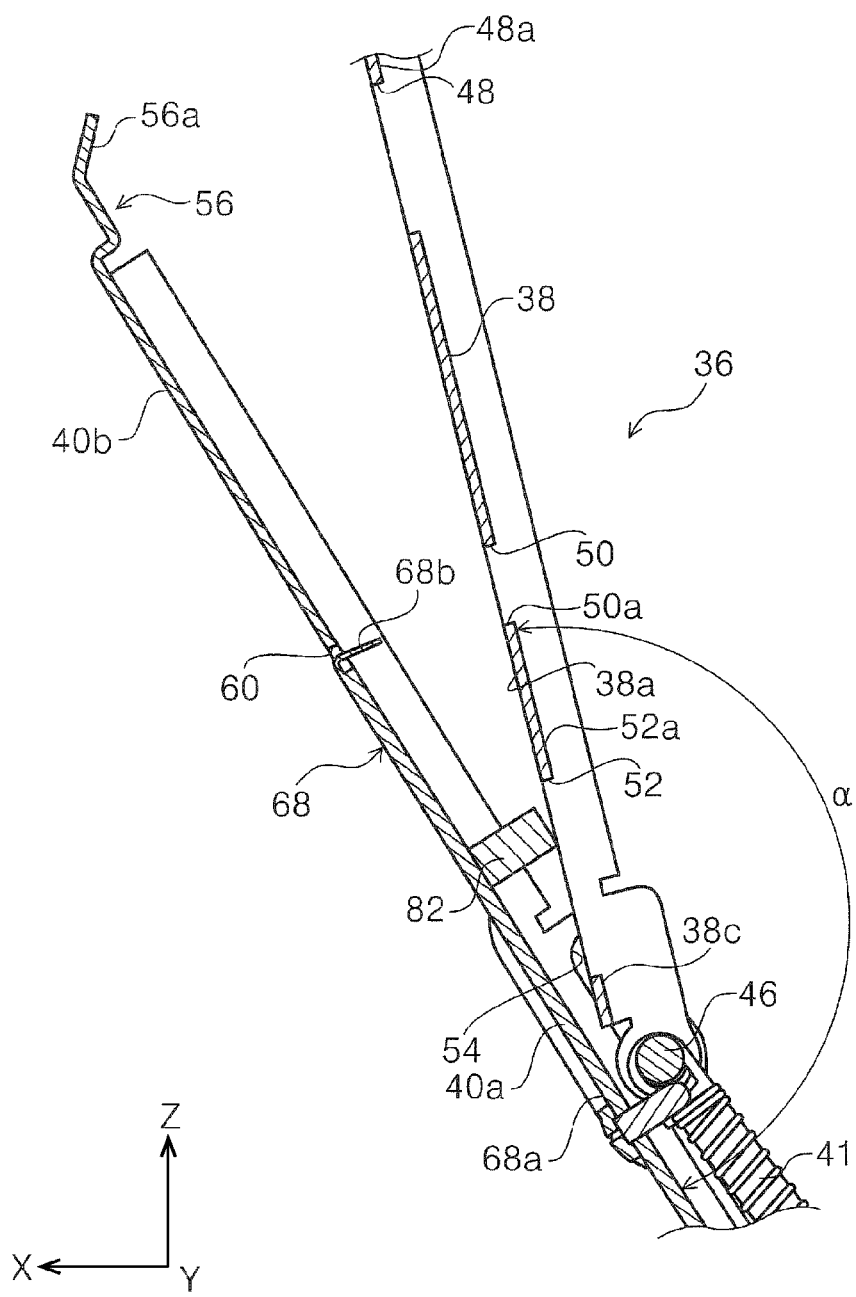
FIG. 31 is a sectional side view illustrating a state in which a first link portion and a second link portion form an unfolded angle α according to a modification example of the second locking mechanism.
Figure 32:
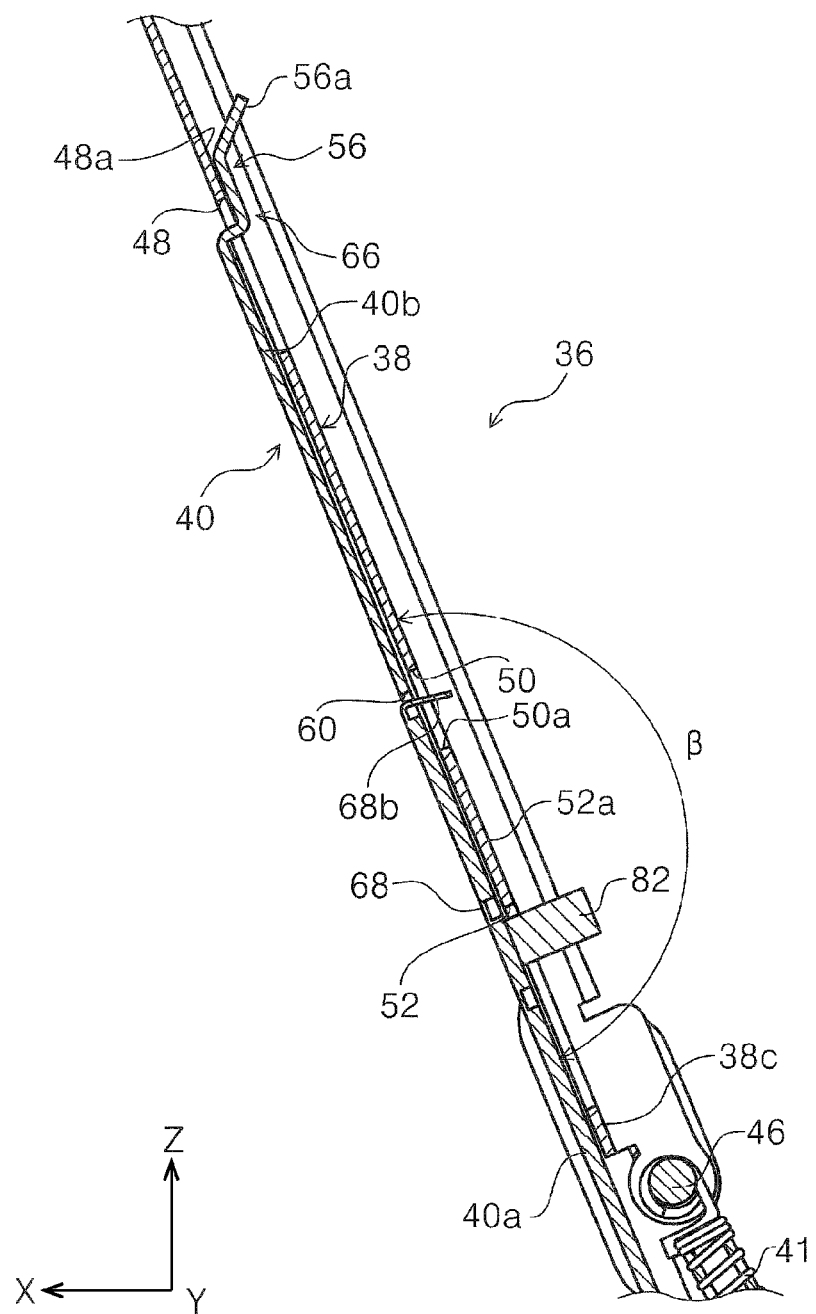
FIG. 32 is a sectional side view illustrating a state in which the first link portion and the second link portion form an unfolded angle β according to the modification example of the second locking mechanism.

FIG. 27 is a perspective view of the scanner unit viewed from below. FIG. 28 is a perspective view illustrating a state in which the scanner unit is detached from the recording mechanism unit in the printer. FIG. 29 is a perspective view illustrating Y-axial and Z-axial positioning portions on a rotary shaft side of the scanner unit. FIG. 30 is a sectional view illustrating the Y-axial and Z-axial positioning portions on the rotary shaft side of the scanner unit. FIG. 31 is a sectional side view illustrating a state in which a first link portion and a second link portion form the unfolded angle α according to a modification example of the second locking mechanism. FIG. 32 is a sectional side view illustrating a state in which the first link portion and the second link portion form the unfolded angle β according to the modification example of the second locking mechanism.

In addition, in an X-Y-Z coordinate system illustrated in the figures, an X direction represents a feeding direction of an original document in a feeding mechanism unit of the scanner unit and a width direction of the recording apparatus, a Y direction represents a main-scanning direction in a reading mechanism unit and a depth direction of the recording apparatus, and a Z direction represents a height direction of the apparatus. Note that, in the figures, a +X direction side is the left side of the apparatus, a −X direction side is the right side of the apparatus, a −Y direction side is the front side of the apparatus, a +Y direction side is the rear side of the apparatus, a +Z-axial direction side is the upper side of the apparatus, and a −Z-axial direction side is the lower side of the apparatus.

Description of Example
Overview of Printer

With reference to FIG. 1, a printer 10 as the "recording apparatus" according to the example includes a recording mechanism unit 12 that configures an apparatus main body, a scanner unit 14 as the "opening/closing unit" that is disposed above the recording mechanism unit 12 and is rotatable with respect to the recording mechanism unit 12, and ink-container accommodating units 16A and 16B disposed on a right-side surface and a left-side surface of the recording mechanism unit 12 in the width direction of the apparatus, respectively.

A medium accommodating units 18, in which a recording medium is accommodated, is provided in a lower portion of the recording mechanism unit 12. In addition, a discharge opening 20 is provided on a side-surface side of the recording mechanism unit 12. A discharge tray 22, which receives the recording medium discharged from the discharge opening 20, is provided in an upper portion of the medium accommodating unit 18. In addition, a carriage 24 (refer to a portion in a dashed line) is configured to be disposed in the recording mechanism unit 12 so as to be capable of reciprocating in the width direction of the apparatus by a drive unit not illustrated. A recording head 25 (refer to a portion in a dashed line) as the "recording unit", which ejects an ink to the recording medium, is provided in a lower portion of the carriage 24.

In addition, an ink container (not illustrated), in which a black ink is stored, is accommodated in an example of the ink-container accommodating unit 16A (on the left side in the width direction of the apparatus), and a plurality of ink containers (not illustrated) corresponding to color inks of magenta, yellow, or cyan, respectively, are accommodated in the ink-container accommodating unit 16B (on the right side in the apparatus width direction). In the configuration of the example, it is possible to supply inks to the recording head 25 from the ink containers.

In the example, the recording medium accommodated in the medium accommodating unit 18 is sent to a region facing the recording head 25 of the carriage 24 by a feeding unit not illustrated. The recording medium receives the ink ejected from the recording head 25 in a region facing the recording head 25 and recording is performed. The recording medium, on which the recording is performed, is discharged toward the discharge tray 22.

Overview of Scanner Unit

Subsequently, an overview of the scanner unit 14 will be described. The scanner unit 14 includes: a reading mechanism unit 14b having a platen 14a (refer to a port ion in a dashed line) having the top surface on which an original document is mounted; and a feeding mechanism unit 14c that is capable of switching between a closing posture and an opening posture with respect to the reading mechanism unit 14b. In the example, the feeding mechanism unit 14c is configured to be rotatable around an end portion thereof on the rear side of the apparatus as a pivot point with respect to the reading mechanism unit 14b.

The feeding mechanism unit 14c has an opening posture with respect to the reading mechanism unit 14b, and thereby it is possible to set the original document on the platen 14a. In addition, a reading unit (not illustrated) that is capable of reading a surface, which is to be read, of the original document set on the platen 14a is provided in the reading mechanism unit 14b. In addition, the feeding mechanism unit 14c is configured to be capable of transporting the original document set on an original document setting portion 14d toward an original document discharge tray 14e. In this configuration, the reading unit is capable of reading the surface of the original document which is to be read during transport of the original document.

Regarding Access to Top Portion of Recording Mechanism Unit

In the example, the scanner unit 14 is configured to be rotatable with respect to the recording mechanism unit 12 as illustrated in FIG. 5. In this configuration, the scanner unit 14 is caused to rotate with respect to the recording mechanism unit 12, and thereby it is possible to access the inside of the recording mechanism unit 12 from above. Hereinafter, a rotating motion of the scanner unit 14 with respect to the recording mechanism unit 12 and posture maintenance after the rotation will be described with reference to FIGS. 1 to 26.

As illustrated in FIG. 1, in the printer 10, cover members 26 are attached on both side surfaces of the reading mechanism unit 14b of the scanner unit 14 in the width direction of the apparatus, respectively. The cover members 26 are detached from the reading mechanism unit 14b of the scanner unit 14, and thereby exposing a connection portion between the recording mechanism unit 12 and the scanner unit 14 (refer to FIGS. 3 and 4). As illustrated in FIG. 3, when the cover member 26 is detached from a left side surface (+X-axial direction side) of the reading mechanism unit 14b in the width direction of the apparatus, the connection portion between the recording mechanism unit 12 and the scanner unit 14, more specifically, hinge portions 28 and 28, which causes the scanner unit 14 to rotate with respect to the recording mechanism unit 12, is exposed.

The hinge portion 28 is attached to the scanner unit 14 via a hinge shaft 30. More specifically, as illustrated in FIG. 30, a hinge bearing hole 28a is provided in the hinge portion 28, and the hinge shaft 30 is received in the hinge bearing hole 28a. In the example, the hinge bearing hole 28a is configured to be an elongate hole extending in the width direction of the apparatus. The hinge shaft 30, therefore the scanner unit 14, is capable of shifting in the hinge bearing hole 28a in the width direction of the apparatus in a state in which an end portion of the scanner unit 14 on the right side in the width direction of the apparatus, which will be described below, is not fixed to the recording mechanism unit 12. Detailed description thereof will be provided below.

An attachment portion 28b is provided in the hinge portion 28 (refer to FIG. 3). As illustrated in FIG. 3, the hinge portion 28 is attached to the recording mechanism unit 12 with a hinge fixing screw 32 in a state in which the attachment portion 28b is caused to come into contact with an end portion of the recording mechanism unit 12 on the left side in the width direction of the apparatus. In this manner, the scanner unit 14 is rotatably attached to the recording mechanism unit 12.

Next, as illustrated in FIG. 4, when the cover member 26 (FIG. 1) is detached from a right side surface (−X-axial direction side) of the reading mechanism unit 14b in the width direction of the apparatus, fixing portions 33a and 33b between the recording mechanism unit 12 and the scanner unit 14 are exposed. As illustrated in FIG. 27, the fixing portion 33a is provided on the end portion of the scanner unit 14 on the right side in the width direction of the apparatus so as to be closer to the front side in the depth direction of the apparatus, and the fixing portion 33b is provided to be closer to the rear side in the depth direction of the apparatus.

In addition, as illustrated in FIG. 28, scanner fixing portions 12a and 12b are provided on an end portion of the top portion of the recording mechanism unit 12 on the right side in the width direction of the apparatus. In the example, the scanner unit 14 is fixed to the recording mechanism unit 12 in a state in which the scanner unit is held in the closed state with respect to the recording mechanism unit 12. More specifically, the fixing portions 33a and 33b are fastened to the scanner fixing portions 12a and 12b with scanner fixing screws 34 (FIG. 4), respectively. In this manner, the scanner unit 14 is fixed to the recording mechanism unit 12.

Hence, in a state illustrated in FIG. 4, the scanner fixing screws 34 are unfastened from the scanner fixing portions 12a and 12b and the scanner fixing screws 34 are removed from the fixing portions 33a and 33b, and thereby the scanner unit 14 enters a state of being rotatable around the hinge shaft 30 as a pivot point with respect to the recording mechanism unit 12. Note that assembly and positioning of the scanner unit 14 with respect to the recording mechanism unit 12 in the printer 10 will be described after a support member 36, which will be described below, is described.

Regarding Support Member

The support member 36 is provided between the recording mechanism unit 12 and the scanner unit 14 as illustrated in FIGS. 5, 14, and 28. More specifically, the support member 36 is configured to be capable of switching between a folded state (refer to FIG. 28) in the width direction of the apparatus and an unfolded state in response to the rotation of the scanner unit 14 with respect to the recording mechanism unit 12, on the top portion of the recording mechanism unit 12. Note that exterior parts and a part of a configuration in the recording mechanism unit 12 and the scanner unit 14 are omitted in FIG. 5.

The support member 36 includes a first link portion 38, a second link portion 40, and a bias unit 41 (refer to FIG. 5). In the example, the first link portion 38 is rotatably connected to a bottom portion of the scanner unit 14 via a first connection portion 37. The first connection portion 37 includes a rotary shaft 42, a first attachment member 43, and a second attachment member 44 as illustrated in FIG. 6. Specifically, the first link portion 38 is formed of a plate-shaped member through a bending process. In the following description, reference sign 38a is assigned to a bottom portion of the first link portion 38, reference sign 38b is assigned to one end portion thereof, and reference sign 38c is assigned to the other end portion thereof. A rotary shaft 42 is attached to the one end portion 38b. The first attachment member 43 is attached to the rotary shaft 42 so as to be rotatable with respect to the first link portion 38.

In addition, the second attachment member 44 is provided on the bottom portion of the scanner unit 14 as illustrated in FIG. 7. As illustrated in FIG. 8, the first attachment member 43 is attached to the second attachment member 44 with an attachment member fixing screw 45. In other words, the first link portion 38 is rotatably connected to the scanner unit 14 via the first attachment member 43 and the second attachment member 44. In addition, as illustrated in FIG. 4, the first connection portion 37 and the attachment member fixing screw 45 are exposed on the right side in the width direction of the apparatus when the cover member 26 (FIG. 1) is detached with the scanner unit 14 in the closing state with respect to the recording mechanism unit 12.

As illustrated in FIG. 9, a connection shaft 46 is provided as a "rotary shaft" in the other end portion 38c of the first link portion 38. The other end portion 38c of the first link portion 38 is rotatably attached to the second link portion 40 on an extension portion 40b side, which serves as one end portion of the second link portion, via the connection shaft 46. A hook hole 48, a hole 50, and a hole 52 are provided in this order in a portion of the first link portion 38 which is closer to the other end portion 38c thereof from the one end portion 38b side to the other end portion 38c side.

With reference to FIGS. 10 and 11, the second link portion 40 is formed of a plate-shaped member through a bending process. In the following description, reference sign 40a is assigned to a link connecting portion of the second link portion 40, reference sign 40b is assigned to the extension portion which serves as the one end portion thereof, and reference sign 40c is assigned to the other end portion thereof. The link connecting portion 40a is provided between the extension portion 40b (on the right side on the paper surface in FIG. 10) as the one end portion of the second link portion 40 and the other end portion 40c. A link connecting portion 40a receives the connection shaft 46 provided on the other end portion 38c of the first link portion 38 and is to connect the first link portion 38 and the second link portion 40. An elongate hole 54 that extends in a longitudinal direction of the second link portion 40 is formed in the link connecting portion 40a. The connection shaft 46 is loosely inserted into the elongate hole 54.

In addition, the second link portion 40 has an extension portion 40b (on the right side on the paper surface in FIG. 10) extending from the link connecting portion 40a. In the example, a first hook 56 as a "hook", a second hook 58 as a "projecting portion", a slit 60, and a deformation regulating portion 62 are provided in the extension portion 40b. In addition, a rotary shaft 64 is attached to the other end portion 40c (on the left side on the paper surface in FIG. 10) of the second link portion 40.

In the example, the first hook 56 projects from the extension portion 40b in the longitudinal direction of the second link portion 40 and then extends upward. The first hook 56 enters a hook hole 48 of the first link portion 38 and is in an engagement state with an edge portion 48a of the hook hole 48, thereby configuring a first locking mechanism 66 as a "locking mechanism" that stops a relative rotation of the first link portion 38 and the second link portion 40 and holds the scanner unit 14 in an opening state with respect to the recording mechanism unit 12. Description thereof will be provided below. In the example, the first locking mechanism 66 includes the first hook 56 and the hook hole 48.

Note that, in the example, the portion of the first hook 56 that extends upward is formed as a guide portion 56a (refer to FIGS. 10, 11, and 19). The guide portion 56a functions as a guide that guides the first hook 56 with respect to the hook hole 48 when the first hook 56 enters the hook hole 48 of the first link portion 38, or functions as a guide that guides the first hook 56 in an extracting direction of the first hook 56 from the hook hole 48 when the first hook 56 is extracted from the hook hole 48, and thus it is possible to easily insert and extract the first hook 56.

In the example, the second hook 58 projects upward from the extension portion 40b and is formed to have a hook shape extending by changing an orientation to a side opposite to the link connecting portion 40a. The second hook 58 comes into contact with the bottom portion 38a of the first link portion 38 when the first link portion 38 and the second link portion 40 are caused to relatively rotate, thereby configuring a second locking mechanism 67 as a "rotation regulating unit" that stops the relative rotation of the first link portion 38 and the second link portion 40 and does not hold the scanner unit 14 in the opening state. Description thereof will be provided below. In the example, the second locking mechanism 67 is configured to include the second hook 58.

In the example, with reference to FIG. 19, the second hook 58 includes a first guide portion 58a and a second guide portion 58b. The first guide portion 58a is configured to be an inclined surface that is inclined and extends to an upper side of the second hook 58 and the second guide portion 58b is configured to be an inclined surface that is inclined and extends to a lower side of the second hook 58. In the example, the first guide portion 58a functions as a guide that guides the second hook 58 with respect to the hole 52 when the second hook 58 enters the hole 52. In addition, the second guide portion 58b functions as a guide that guides the second hook 58 with respect to the hole 52 after the second hook 58 is guided to the first guide portion 58a when the second hook 58 enters the hole 52, and functions as a guide that guides the second hook 58 in an extracting direction from the hole 52 when the second hook 58 is extracted from the hole 52.

In addition, a release regulating unit 68 is attached to the extension portion 40b. As illustrated in FIG. 12, the release regulating unit 68 is configured to be a plate-shaped leaf spring member as a whole, is provided with an attachment portion 68a on the left side on the paper surface in FIG. 12, and is provided with a projection 68b that projects upward from the end portion of the release regulating unit on the right side on the paper surface. In addition, a lever-shaped operation portion 68c is provided between the attachment portion 68a and the projection 68b in a rightward-leftward direction on the paper surface. Note that the operation portion 68c is configured to have resin parts which are attached to the left spring member.

The release regulating unit 68 is attached to the bottom side of the second link portion 40 via the attachment portion 68a (FIG. 11). The projection 68b projects upward from the slit 60 of the second link portion 40.

The deformation regulating portion 62 is configured to be a plate-shaped portion that projects in an extending direction, in the extension portion 40b, and an intersecting direction of the second link portion 40, in the extension portion 40b. In the example, the deformation regulating portion 62 is configured to come into contact with the operation portion 68c when the operation portion 68c of the release regulating unit 68 is pushed to the lower side of the second link portion 40 in the plate thickness direction by a predetermined amount. In other words, the deformation regulating portion 62 regulates the operation portion 68c from being pushed by the predetermined amount or more to the lower side in the plate thickness direction. In the example, the predetermined amount is set such that an amount of shift of the projection 68b and the operation portion 68c to the lower side in the plate thickness direction is within an elastic deformation region of the leaf spring.

As illustrated in FIG. 13, the second link portion 40 is attached via a second connection portion 74 to a frame member 70 that configures the top portion of the recording mechanism unit 12. In the example, the second connection portion 74 includes a rotary shaft 64 and a third attachment member 76. The rotary shaft 64 provided on the other end portion 40c side of the second link portion 40 is rotatably attached to the third attachment member 76. In other words, the second link portion 40 is attached to the frame member 70 via the second connection portion 74 so as to be rotatable with respect to the recording mechanism unit 12.

In addition, as illustrated in FIGS. 5, 6, and 13, the bias unit 41 has one end that is attached to the connection shaft 46 and the other end that is attached to the frame member 70. In the example, the bias unit 41 is configured to be a tension spring. The bias unit 41 biases the support member 36 in a direction in which the first link portion 38 and the second link portion 40 are unfolded, that is, in a direction an unfolded angle β which will be described below is formed therebetween.

Here, a folded state between the recording mechanism unit 12 and the scanner unit 14 is described before the unfolded state of the support member 36 is described. As illustrated in FIGS. 14 and 15, with the scanner unit 14 held in the closing state with respect to the recording mechanism unit 12, the support member 36 enters a state in which the first link portion 38 is folded with respect to the second link portion 40 with the connection shaft 46 as a pivot point. More specifically, in this state, the first link portion 38 is disposed in an upper side of the second link portion 40 in the height direction of the apparatus.

With reference to FIGS. 15 to 17, shock-absorbing members 72A and 72B are provided to the recording mechanism unit 12 and the scanner unit 14, respectively, so as to prevent a noise produced due to a violent contact of the folded support member 36 with the recording mechanism unit 12 and the scanner unit 14 and a violent contact thereof in the height direction of the apparatus during transportation of the printer 10 or the like. In the example, the shock-absorbing members 72A and 72B are configured to be elastic members, and are configured to be sponge members as an example in the example.

As illustrated in FIGS. 15 and 16, the shock-absorbing member 72A is provided at a position corresponding to the extension portion 40b of the second link portion 40 in the frame member 70 of the recording mechanism unit 12. The shock-absorbing member 72A comes into contact with the second link portion 40 from below in the height direction of the apparatus. The shock-absorbing member 72B is provided on the other end portion 38c of the first link portion 38, that is, on the side on which the connection shaft 46 is provided, on the bottom portion of the scanner unit 14, with the scanner unit 14 held in the closing state with respect to the recording mechanism unit 12. The shock-absorbing member 72B comes into contact with the first link portion 38 from above in the height direction of the apparatus.

Hence, the support member 36 folded between the recording mechanism unit 12 and the scanner unit 14 is interposed between the shock-absorbing member 72A and the shock-absorbing member 72B in the height direction of the apparatus. In this manner, even when a shock is applied to the support member 36, the shock-absorbing members 72A and 72B absorb the shock applied to the support member 36 in the height direction of the apparatus, the support member 36 less comes into violent contact with the recording mechanism unit 12 and the scanner unit 14, and it is possible to reduce a noise occurrence.

Subsequently, a folded/unfolded operation of the support member 36 will be described with reference to FIGS. 5 and 18 to 26. When the scanner unit 14 illustrated in FIG. 4 is caused to rotate in a counterclockwise direction in FIG. 5 by the hinge portion 28 from a state in which the scanner unit 14 is held in the closing state with respect to the recording mechanism unit 12, the first link portion 38 and the second link portion 40 in the support member 36 enter a state illustrated in FIGS. 18 and 19.

More specifically, the scanner unit 14 is caused to rotate with respect to the recording mechanism unit 12, and thereby the first link portion 38 and the second link portion 40 relatively rotate. As illustrated in FIG. 19, when the first link portion 38 and the second link portion 40 form the unfolded angle α therebetween, the second hook 58 of the second link portion 40 comes into contact with the bottom portion 38a of the first link portion 38.

In this state, the connection shaft 46 as the pivot point of the first link portion 38 and the second link portion 40 is positioned in the elongate hole 54 of the second link portion 40 on the lower side in the height direction of the apparatus. In a state in which the connection shaft 46 is disposed at a position in the elongate hole 54 illustrated in FIG. 19, the second hook 58 comes into contact with the bottom portion 38a. Therefore, the rotating motion is regulated in a direction in which the unfolded angle is further increased from the unfolded angle α as a "second angle", that is, in a direction in which the first link portion 38 and the second link portion 40 are caused to relatively further rotate. In other words, the second hook 58 and the bottom portion 38a enter a connect state, thereby the second locking mechanism 67 enters a locking state, and then, the relative rotating motion of the first link portion 38 and the second link portion 40 is regulated.

In this state, the scanner unit 14 enters a state in which the scanner unit 14 is not held in the opening state with respect to the recording mechanism unit 12. In other words, when an external force to the scanner unit 14 (a force that is to cause the scanner unit 14 to rotate with respect to the recording mechanism unit 12, for example, a force produced when an operator lifts the scanner unit 14) disappears, the state of the scanner unit 14 is changed into the closing posture with respect to the recording mechanism unit 12 due to the own weight of the scanner unit 14. Hence, it is possible for an operator who opens and closes the scanner unit 14 to avoid falsely recognizing that the scanner unit 14 is in the opening state although the scanner unit 14 is in an incomplete opening state.

Next, with reference to FIGS. 20 to 22, when the scanner unit 14 is caused to more rotate in the counterclockwise direction in FIG. 20 from the state illustrated in FIG. 19, the connection shaft 46 as the pivot point of the first link portion 38 and the second link portion 40 is shifted to a position in the elongate hole 54 on the upper side in the height direction of the apparatus illustrated in FIG. 21 from the position (illustrated in FIG. 19) in the elongate hole on the lower side in the height direction of the apparatus. In other words, the first link portion 38 slides with respect to the second link portion 40 to the upper side in the height direction of the apparatus.

The sliding causes the regulating state of the second locking mechanism 67 to be released, that is, the contact state between the second hook 58 and the bottom portion 38a of the first link portion 38 is released, and it is possible for the first link portion 38 and the second link portion 40 to relatively rotate in a direction in which the first link portion 38 and second link portion 40 form an unfolded angle which is larger than the unfolded angle α thereof.

When the scanner unit 14 is caused to more rotate in the opening direction of the scanner unit 14 with respect to the recording mechanism unit 12, the first link portion 38 and the second link portion 40 form the unfolded angle β as a "first angle", which is an unfolded angle larger than the unfolded angle α. When the first link portion 38 and the second link portion 40 form the unfolded angle β therebetween, the first hook 56 of the second link portion 40 is received in the hook hole 48 of the first link portion 38 (refer to FIGS. 21 and 22). In addition, similarly, the second hook 58 is guided to the first guide portion 58a and is received in the hole 52 of the first link portion 38 (refer to FIGS. 21 and 22). Note that, in the example, the unfolded angle β is set to an angle at which the first link portion 38 and the second link portion 40 form a straight line shape therebetween.

Note that, in FIGS. 9 and 22, in this state, the first hook 56 is received only in the hook hole 48 and the first hook 56 does not engage with the edge portion 48a of the hook hole 48. In other words, the first locking mechanism 66 enters a non-locking state.

In other words, when the first link portion 38 and the second link portion 40 form the unfolded angle β therebetween, the projection 68b of the release regulating unit 68, which projects from the slit 60 of the second link portion 40 to the first link portion 38 side, comes into contact with the bottom portion 38a of the first link portion 38 and is pressed against the bottom portion 38a, and the projection 68b is shifted to the second link portion 40 side against a bias force due to the elasticity of the leaf spring.

Next, with reference to FIGS. 23 to 25, when an external force acting on the scanner unit 14 in the state illustrated in FIG. 20 decreases (for example, an operator who lifts the scanner unit 14 takes off his or her hand from the scanner unit 14), the scanner unit 14 is shifted to the lower side of the apparatus due to the own weight of the scanner unit 14. In this time, the first link portion 38 slides along the second link portion 40 to the upper side in the height direction of the apparatus in the state of forming the unfolded angle β. The sliding causes the connection shaft 46 to move through the elongate hole 54 to a position in the elongate hole 54 on the lower side from a position in the elongate hole on the upper side of the height direction of the apparatus.

In this manner, the hook hole 48 slides with respect to the first hook 56 in a direction in which the second link portion 40 extends. The first hook 56 is guided to the guide portion 56a and enters an engagement state with the edge portion 48a of the hook hole 48 (refer to FIGS. 24 and 25). In other words, the first locking mechanism 66 enters a locking state. In this state, when the scanner unit 14 is causes to relatively rotate in a direction in which the unfolded angle between the first link portion 38 and the second link portion 40 is more decreased than the unfolded angle β, that is, the scanner unit 14 is caused to relatively rotate in a direction in which the scanner unit 14 is in the closing state with respect to the recording mechanism unit 12, the contact between the first hook 56 and the edge portion 48a of the hook hole 48 regulates the relative rotation of the first link portion 38 and the second link portion 40.

In other words, the first locking mechanism 66 stops the relative rotation of the first link portion 38 and the second link portion 40 by causing the scanner unit in the closing state after the scanner unit 14 is in the further opening state, in the state in which the first link portion 38 and the second link portion 40 relatively form the unfolded angle β in a process of performing the opening state of the scanner unit 14.

In addition, similarly, the hole 52 also slides with respect to the second hook 58 in a direction in which the second link portion 40 extends. The second hook 58 is guided to the second guide portion 58b and enters an engagement state with an edge portion 52a of the hole 52 (refer to FIGS. 24 and 25). Hence, the second locking mechanism 67 also enters a state of stopping the relative rotation of the first link portion 38 and the second link portion 40, along with the first locking mechanism 66.

The projection 68b of the release regulating unit 68 pressed against the bottom portion 38a of the first link portion 38 is released from a pressure state by causing the hole 50 to slide with respect to the second link portion 40, and enters a state of entering the hole 50 by the bias force produced due to an elasticity of the leaf spring (refer to FIGS. 24 and 25). In this state, the scanner unit 14 maintains the opening posture with respect to the recording mechanism unit 12 by the support member 36 even when the operator takes off a hand from the scanner unit 14.

Next, the release regulating unit 68 will be described with reference to FIGS. 24 and 26. As illustrated in FIG. 24, in a state in which the locking state of the first locking mechanism 66 and the second locking mechanism 67 stop the relative rotation between the first link portion 38 and the second link portion 40, the projection 68b of the release regulating unit 68 enters a state of entering the hole 50. In this state, in order to release the stopping state of the relative rotation of the first link portion 38 and the second link portion 40 in the locking state of the first locking mechanism 66 and the second locking mechanism 67, the first link portion 38 needs to slide with respect to the second link portion 40 to the upper side in the height direction of the apparatus. More specifically, the first link portion 38 slides with respect to the second link portion 40, so as to release the engagement state between the first hook 56 and the edge portion 48a of the hook hole 48 and the engagement state between the second hook 58 and the edge portion 52a of the hole 52.

However, as illustrated in FIG. 26, when the first link portion 38 is caused to move with respect to the second link portion 40, the projection 68b of the release regulating unit 68, which enters the hole 50, comes into contact with the edge 50a of the hole 50 illustrated in FIG. 26 in the hole 50 and regulates the sliding of the first link portion 38 with respect to the second link portion 40. In this state, since at least a part of the first hook 56 in a direction in which the first hook 56 is extracted from the hook hole 48, for example, the guide portion 56a, overlaps the edge portion 48a of the hook hole 48, the relative rotation of the first link portion 38 and the second link portion 40 is regulated.

Note that, as illustrated in FIGS. 25 and 26, the length of the hole 50 in the longitudinal direction of the second link portion 40 is set to be shorter than the length of the hook hole 48. In other words, an amount of shift, by which the projection 68b can shift in the hole 50 when the second link portion 40 and the first link portion 38 relatively slides in the longitudinal direction of the second link portion 40, is set to be smaller than an amount of shift by which the first hook 56 can shift in the hook hole 48. Hence, before the first hook 56 is extracted from the hook hole 48, the projection 68b comes into contact with the edge 50a of the hole 50 such that relative sliding of the first link portion 38 and the second link portion 40 is regulated. Therefore, it is possible to prevent the locking of the first locking mechanism 66 from being inadvertently released. In other words, the release regulating unit 68 regulates a locking release in a direction in which the scanner unit 14 is in the opening state.

In addition, since at least a part of the second hook 58 also overlaps the edge portion 52a of the hole 52 in the second hook 58, the relative rotation of the first link portion 38 and the second link portion 40 is regulated.

Here, in the state illustrated in FIG. 25, that is, the locking state of the first locking mechanism 66, and the stopping state of the relative rotation of the first link portion 38 and the second link portion 40 in the second locking mechanism 67, the operation portion 68c of the release regulating unit 68 is pushed downward obliquely to the left side on the paper surface in FIG. 25, the projection 68b and the operation portion 68c are shifted with respect to the attachment portion 68a that is attached to the second link portion 40. Specifically, the projection 68b is shifted from the hole 50 in an evacuating direction.

When the first link portion 38 is caused to relatively slide with respect to the second link portion 40 in the state in which the operation portion 68c of the release regulating unit 68 is pressed and the projection 68b is evacuated from the hole 50, the engagement state between the first hook 56 and the edge portion 48a of the hook hole 48 and the engagement state between the second hook 58 and the edge portion 52a of the hole 52 as illustrated in FIGS. 21 and 22 are released. In this manner, the first hook 56 and the second hook 58 are guided to the guide portion 56a and the second guide portion 58b, respectively, and it is possible to extract the first and second hooks from the hook hole 48 and the hole 52. As a result, the stopping state of the relative rotation of the first link portion 38 and the second link portion 40 in the locking state of the first locking mechanism 66 and the second locking mechanism 67 is released.

Then, the first link portion 38 and the second link portion 40 can relatively rotate in the direction in which the scanner unit 14 is in the closing state with respect to the recording mechanism unit 12, that is, in a direction in which the unfolded angle β of the support member 36 decreases. In other words, the opening state of the scanner unit 14 with respect to the recording mechanism unit 12 is released, and it is possible for the scanner unit 14 to be in the closing state with respect to the recording mechanism unit 12.

Regarding Assembly of Scanner Unit to Recording Mechanism Unit

The assembly of the scanner unit 14 with respect to the recording mechanism unit 12 will be described with reference to FIGS. 4, 7, 8, 13, 14, 15, and 27 to 30. As described above, the scanner unit 14 is connected to the left side surface of the recording mechanism unit 12 in the width direction of the apparatus via the hinge portions 28 and 28. The fixing portions 33a and 33b of the scanner unit 14 are fastened to the scanner fixing portions 12a and 12b of the recording mechanism unit 12 on the right side in the width direction of the apparatus, with the scanner fixing screws 34

(FIG. 4), respectively. Hereinafter, a procedure of an assembly and the positioning of the scanner unit 14 with respect to the recording mechanism unit 12 in the depth direction of the apparatus, in the width direction of the apparatus, and in the height direction of the apparatus will be described.

With reference to FIG. 27, positioning portions 78 and 78 are provided on the bottom portion of the scanner unit 14. The positioning portion 78 projects downward from the bottom portion of the scanner unit 14 in the height direction of the apparatus. In the example, the positioning portions 78 and 78 are provided in a portion on the bottom portion of the scanner unit 14, which is closer to the hinge portion 28, and in a portion which is closer to the fixing portion 33a.

A configuration of the positioning portion 78 will be described with reference to FIGS. 7 and 8. The positioning portion 78 is formed as a stepped boss having a circular cylinder shape. More specifically, the positioning portion 78 has a protrusion 78a on a front end portion thereof and a stepped portion 78b.

In addition, elongate holes 80 and 80 are provided on the frame member 70 that configures the top portion of the recording mechanism unit 12, at positions corresponding to positions of the positioning portions 78 with the scanner unit 14 in the closing state with respect to the recording mechanism unit 12. The elongate hole 80 extends in the top surface of the frame member 70 in the width direction of the apparatus. The elongate hole 80 is provided in the end portion of the frame member 70 on the right side in the width direction of the apparatus as illustrated in FIG. 13, that is, a position closer to the fixing portion 33a, corresponding to the positioning portion 78 provided to be closer to the fixing portion 33a. In addition, the elongate hole 80 is provided in the end portion of the frame member 70 on the left side in the width direction of the apparatus as illustrated in FIG. 29, that is, a position closer to the hinge portion 28, corresponding to the positioning portion 78 provided to be closer to the hinge portion 28.

FIG. 28 illustrates a state before the scanner unit 14 is attached to the recording mechanism unit 12. In FIG. 28, the support member 36 is attached on the top portion of the recording mechanism unit 12. The scanner unit 14 illustrated in FIG. 27 is attached.

First, the hinge portions 28 and 28 of the scanner unit 14 are attached to the recording mechanism unit 12. As illustrated in FIG. 30, the scanner unit 14 forms the closing posture with respect to the recording mechanism unit 12. At this time, the protrusion 78a of the positioning portion 78 is received in the elongate hole 80. The top surface of the frame member 70 comes into contact with the stepped portion 78b. In this manner, the position of the scanner unit 14 with respect to the recording mechanism unit 12 in the height direction of the apparatus is defined by the stepped portion 78b.

When the scanner unit 14 is pressed with respect to the recording mechanism unit 12 to the rear side in the depth direction of the apparatus in the state in which the protrusion 78a is received in the elongate hole 80, the protrusion 78a comes into contact with a wall surface in the elongate hole 80 on the rear side of the apparatus, and the position of the scanner unit 14 with respect to the recording mechanism unit 12 is defined in the depth direction of the apparatus.

In this manner, the scanner unit 14 is positioned with respect to the recording mechanism unit 12 in the depth direction of the apparatus and in the height direction of the apparatus. The hinge bearing hole 28a of the hinge portion 28 is in a state of extending in the width direction of the apparatus. Hence, the hinge shaft 30 can be shifted in the width direction of the apparatus within a range of the hinge bearing hole 28a in the width direction of the apparatus. In other words, the scanner unit 14 can be shifted with respect to the recording mechanism unit 12 in the width direction of the apparatus.

Next, the support member 36 is connected to the scanner unit 14. Specifically, as illustrated in FIG. 14, the first attachment member 43, which is connected to the first link portion 38, is connected to the second attachment member 44 with the attachment member fixing screw 45. The support member 36 has a configuration in which the connection shaft 46 is received in the elongate hole 54 in the link connecting portion 40a as illustrated in FIGS. 14 and 15. The scanner unit 14 has a closing posture with respect to the recording mechanism unit 12, the support member 36 is also in the closing state, and the elongate hole 54 is in a state of extending in the width direction of the apparatus.

Hence, in the closing state of the support member 36, the first link portion 38 is capable of sliding with respect to the second link portion 40, therefore, with respect to the recording mechanism unit 12 in the width direction of the apparatus.

As illustrated in FIG. 4, the fixing portions 33a and 33b of the scanner unit 14 are connected to the scanner fixing portions 12a and 12b (refer to FIG. 28) of the recording mechanism unit 12. Here, when the scanner fixing screws 34 are fastened to the scanner fixing portions 12a and 12b via the fixing portions 33a and 33b, the scanner unit 14 moves with respect to the recording mechanism unit 12 to the left side in the width direction of the apparatus in response to the fastening of the scanner fixing screws 34. When the fixing portions 33a and 33b are fastened to the scanner fixing portions 12a and 12b by the scanner fixing screws 34, the scanner unit 14 is positioned with respect to the recording mechanism unit 12 in the width direction of the apparatus. Then, the scanner unit 14 is fixed to the recording mechanism unit 12 in the closing state.

In other words, when the scanner unit 14 in the example is in the closing state with respect to the recording mechanism unit 12, the scanner unit is positioned in the depth direction and the height direction of the apparatus, the fixing portions 33a and 33b is connected to the scanner fixing portions 12a and 12b by fastening with screws from the right side in the width direction of the apparatus, and thereby the scanner unit is positioned in the width direction of the apparatus.

Modification Example of Example (1) In the example, the second hook 58 provided in the second link portion 40 is configured to have a crooked shape; however, a column-shaped boss portion 82 as illustrated in FIGS. 31 and 32 may be employed instead of the configuration. Also in this configuration, when the first link portion 38 and the second link portion 40 form the unfolded angle α therebetween as illustrated in FIG. 31, the boss portion 82 comes into contact with the bottom portion 38a of the first link portion 38, the scanner unit 14 is regulated from being held in the opening state with respect to the recording mechanism unit 12, and the boss portion 82 is received in the hole 52 when the first link portion 38 and the second link portion 40 form the unfolded angle β as illustrated in FIG. 32.

(2) The example employs the configuration in which the connection shaft 46 is provided to the first link portion 38 and the elongate hole 54 is provided in the link connecting portion 40a of the second link portion 40; however, instead of the configuration, a configuration in which the elongate hole 54 is provided in the first link portion 38 and the connection shaft 46 is provided in the link connecting portion 40a may be employed.

(3) The example employs the configuration in which the positioning portion 78 is provided to the scanner unit 14 and the elongate hole 80 is provided in the frame member 70; however, instead of the configuration, a configuration in which the positioning portion 78 is provided to the frame member 70 and the elongate hole 80 is provided in the scanner unit 14 may be employed.

(4) The example employs the configuration in which the scanner unit 14 rotates with respect to the recording mechanism unit 12 with the end portion on the right side in the width direction of the apparatus as a free end; however, instead of the configuration, a configuration in which the scanner unit rotates with the end portion on the left side in the width direction of the apparatus as a free end may be employed, or a configuration in which the scanner unit rotates with a front side or a rear side in the depth direction of the apparatus as a free end may be employed.

(5) The example employs the configuration in which the support member 36 that holds the scanner unit 14 in the opening state is connected to the scanner unit 14 on the right-side surface in the width direction of the apparatus; however, instead of the configuration, a configuration in which the connection is performed on the front side or the rear side in the depth direction of the apparatus may be employed.

(6) In the example, in the state in which the scanner unit 14 is detached from the recording mechanism unit 12, the support member 36 is in a state of being connected to the recording mechanism unit 12 side; however, instead of the configuration, a configuration in which the scanner unit 14 is detached from the recording mechanism unit 12 in a state in which the support member 36 is connected to the scanner unit 14 side may be employed.

(7) The example employs the configuration in which the first locking mechanism 66 is provided at the position more separated from the connection shaft 46 of the link connecting portion 40a in the support member 36, than the second locking mechanism 67; however, instead of the configuration, a configuration in which the first locking mechanism 66 is provided at a position closer to the connection shaft 46 than the second locking mechanism 67 may be employed. In other words, the second locking mechanism 67 may be disposed at a position more separated from the connection shaft 46 than the first locking mechanism 66.

(8) The example employs the configuration in which the shock-absorbing members 72A and 72B are the sponge members; however, instead of the configuration, a configuration in which the shock-absorbing members 72A and 72B are spring members or the like may be employed.

(9) The example employs the configuration in which the "opening/closing unit" is the scanner unit 14; however, instead of the configuration, a configuration in which the "opening/closing unit" is a cover unit may be employed.

(10) In the example, the hole 50 of the first link portion 38 is formed to have a size with a margin with respect to the projection 68b of the release regulating unit 68 in an extending direction of the second link portion 40 as illustrated in FIG. 25. However, instead of the configuration, after the first link portion 38 and the second link portion 40 form the unfolded angle β therebetween and the first hook 56 is in a state of being capable of engaging with the edge portion 48a of the hook hole 48, the size of the hole 50 in the extending direction of the second link portion 40 may be a size by which the projection 68b as a pin point enters the hole 50 may be employed. In addition, after the first link portion 38 and the second link portion 40 form the unfolded angle β therebetween and at least a part of the first hook 56 is in a state of being capable of engaging with the edge portion 48a of the hook hole 48, it is preferable that the hole 50 in the extending direction of the second link portion 40 be provided at a position closer to the other end portion 38c such that the projection 68b enters the hole 50.

(11) The example employs the configuration in which the scanner fixing portion 12a (refer to FIG. 28) is fixed to the fixing portion 33a with the two scanner fixing screws 34 as illustrated in FIG. 4; however, instead of the configuration, a configuration in which the scanner fixing portion 12a is fixed to the fixing portion 33a with one scanner fixing screw 34 may be employed.

To summarize the above description, the printer 10 includes the recording mechanism unit 12 having the recording head 25 which performs recording on the recording medium, the scanner unit 14 which is connected to the top portion of the recording mechanism unit 12 so as to be rotatable with respect to the recording mechanism unit 12 and which rotates, thereby opening and closing the top portion of the recording mechanism unit 12, and the support member 36 that holds the scanner unit 14 in the opening state. The support member 36 includes the first link portion 38 that is rotatably connected to the scanner unit 14, a second link portion 40 that is rotatably connected to the first link portion 38 and that is rotatably connected to the recording mechanism unit 12, the first locking mechanism 66 that stops the relative rotation of the first link portion 38 and the second link portion 40 in a state in which the first link portion 38 and the second link portion 40 relatively form the unfolded angle β therebetween, and that holds the scanner unit 14 in the opening state, and the second locking mechanism 67 that stops the relative rotation of the first link portion 38 and the second link portion 40 in the opening direction of the scanner unit 14 in a state in which the first link portion 38 and the second link portion 40 relatively form the unfolded angle α which is smaller than the unfolded angle β, and that does not hold the scanner unit 14 in the opening state.

In the configuration described above, the first locking mechanism 66 holds the scanner unit 14 in the opening state. Thus, before the first locking mechanism 66 locks the scanner unit 14, the second locking mechanism 67 is provided to stop the relative rotation of the first link portion 38 and the second link portion 40 in the opening direction of the scanner unit 14 and not to hold the scanner unit 14 in the opening state. Hence, it is possible for an operator who opens and closes the scanner unit 14 to avoid falsely recognizing that the scanner unit 14 is in the opening state although the scanner unit 14 is in the incomplete opening state.

The unfolded angle β in the support member 36 is set to the angle at which the first link portion 38 and the second link portion 40 form a straight line shape therebetween. In the configuration, a load, which is applied to the support member 36 by the scanner unit 14, is unlikely to lead to a relative rotation of the first link portion 38 and the second link portion 40 such that it is possible to effectively stop the relative rotation of the first link portion 38 and the second link portion 40.

The printer 10 includes the bias unit 41 that biases the support member 36 in a direction in which the first link portion 38 and the second link portion 40 form the unfolded angle β therebetween. In the configuration, the bias unit 41 can support the opening work of the scanner unit 14, and it is possible to open the scanner unit 14 with a rather small force.

The bias unit 41 is a tension spring that exerts a tensile force between the support member 36 and the recording mechanism unit 12. In the configuration, a bias force in the opening direction is unlikely to be applied to the scanner unit unlike a case of using, for example, a torsion spring as the bias unit 41 when the scanner unit 14 is in the closing state such that it is possible to appropriately hold the scanner unit 14 in the closing state.

The second link portion 40 includes the extension portion 40b extending to the scanner unit 14 from the link connecting portion 40a as the connection portion with the first link portion 38. The second locking mechanism 67 is configured to have the second hook 58 projecting on the extension portion 40b toward the first link portion 38 and to stop the relative rotation of the first link portion 38 and the second link portion 40 with the second hook 58 coming into contact with the first link portion 38.

In the configuration, since the second locking mechanism 67 is configured to stop the relative rotation of the first link portion 38 and the second link portion 40 with the second hook 58 provided on the second link portion 40 coming into contact with the bottom portion 38a of the first link portion 38, the second locking mechanism 67 can be configured to have a simplified structure at low costs.

The link connecting portion 40a is configured to have a connection shaft 46 which is provided on one of the first link portion 38 or the second link portion 40, and the elongate hole 54 which is provided on the other one thereof and into which the connection shaft 46 is loosely inserted. The hole 52, through which the second hook 58 penetrates, is formed in the first link portion 38. The first link portion 38 slides with respect to the second link portion 40 from the state in which the second hook 58 comes into contact with the bottom portion 38a of the first link portion 38, and thereby the second hook 58 penetrates through the hole 52.

Wherein the second hook 58 has a crooked shape, the second hook 58 penetrates through the hole 52 and hooks on the edge portion 52a of the hole 52, thereby the second locking mechanism 67 stops, along with the first locking mechanism 66, the relative rotation of the first link portion 38 and the second link portion 40 in the state in which the first link portion 38 and the second link portion 40 relatively form the unfolded angle β therebetween.

In the configuration, since the second locking mechanism 67 stops, along with the first locking mechanism 66, the relative rotation of the first link portion 38 and the second link portion 40 in the state in which the first link portion 38 and the second link portion 40 relatively form the unfolded angle β therebetween, it is possible to much more firmly hold the scanner unit 14 in the opening state.

The second locking mechanism 67 and the first locking mechanism 66 are provided in this order from a connection site of the support member 36 to the first link portion 38 and the second link portion 40, that is, the link connecting portion 40a, toward the scanner unit 14. In the configuration, since the second hook 58 is provided at the position closer to the link connecting portion 40a, it is possible to reduce the size of the second hook 58.

The first locking mechanism 66 is configured to stop the relative rotation of the first link portion 38 and the second link portion 40 by causing the scanner unit in the closing state after the scanner unit 14 is in the more opening state, in the state in which the first link portion 38 and the second link portion 40 relatively form the unfolded angle β in a process of performing the opening state of the scanner unit 14.

The scanner unit 14 is configured to have the reading mechanism unit 14b that reads the original document and the feeding mechanism unit 14c that automatically feeds the original document to the reading mechanism unit 14b.

To summarize the above description, the printer 10 includes the recording mechanism unit 12 having the recording head 25 which performs recording on the recording medium, the scanner unit 14 which is connected to the top portion of the recording mechanism unit 12 so as to be rotatable with respect to the recording mechanism unit 12 and which rotates, thereby opening and closing the top portion of the recording mechanism unit 12, and the support member 36 that holds the scanner unit 14 in the opening state. The support member 36 includes the first link portion 38 that is rotatably connected to the scanner unit 14, a second link portion 40 that is rotatably connected to the first link portion 38 and that is rotatably connected to the recording mechanism unit 12, the first locking mechanism 66 that stops the relative rotation of the first link portion 38 and the second link portion 40, and that holds the scanner unit 14 in the opening state, and the release regulating unit 68 that regulates the release of the locking by the first locking mechanism 66.

In the configuration, since the support member 36 including the first link portion 38 and the second link portion 40 includes the first locking mechanism 66 that stops the relative rotation of the first link portion 38 and the second link portion 40 and holds the scanner unit 14 in the opening state, and the release regulating unit 68 that regulates the release of the locking by the first locking mechanism 66, it is possible to lock the first link portion 38 and the second link portion 40 and to reliably hold the scanner unit 14 in the opening state, and it is possible to prevent unintended blocking of the scanner unit 14.

The release regulating unit 68 regulates the release of the locking by the first locking mechanism 66 when the scanner unit 14 rotates in the opening direction.

The second link portion 40 includes the extension portion 40b extending to the scanner unit 14 side from the link connecting portion 40a as the connection portion with the first link portion 38. The first locking mechanism 66 includes the first hook 56 provided on the extension portion 40b of the second link portion 40 so as to project toward the first link portion 38, and a hook hole 48 which is provided in the first link portion 38 and to which the first hook 56 is hooked. In the configuration, the second link portion 40 relatively slides with respect to the first link portion 38 in the state in which the first hook 56 penetrates through the hook hole 48, thereby the first hook 56 hooks on the edge portion 48a of the hook hole 48, and the relative rotation of the first link portion 38 and the second link portion 40 is stopped. The release regulating unit 68 includes the projection 68b that is provided to the extension portion 40b of the second link portion 40 and can move forward and backward with respect to the first link portion 38, and the hole 50 that is provided in the first link portion 38 and into which the projection 68b is loosely inserted. The amount of shift, by which the projection 68b can be shifted in the hole 50 when the second link portion 40 and the first link portion 38 relatively slide, is smaller than the amount of shift by which the first hook 56 can be shifted in the hook hole 48.

In the configuration, the release regulating unit 68 is configured to have the projection 68b that is provided on the second link portion 40 and the hole 50 that is provided in the first link portion 38, and to regulate the release of the locking by the first locking mechanism 66 using a relationship between the amount of the sliding of the first hook 56 in the hook hole 48 and the amount of the sliding of the projection 68b in the hole 50. Therefore, it is possible to configure the release regulating unit 68 with a simplified structure at low costs.

In addition, since the projection 68b is loosely inserted in the hole 50, that is, the hole 50 is formed to have a margin with respect to the projection 68b, the projection 68b can easily enter the hole 50 and, as a result, it is possible to reliably regulate the release of the locking of the first locking mechanism 66.

The projection 68b is biased against the hole 50. In the configuration, since the projection 68b is biased against the hole 50, that is, the projection is biased in a direction in which the release of the locking of the first locking mechanism 66 is regulated, it is possible to regulate the release of the locking of the first locking mechanism 66 with an easy operability.

The release regulating unit 68 has the operation portion 68c that causes the projection 68b to be evacuated from the hole 50. In the configuration, it is possible to easily evacuate the projection 68b from the hole 50, that is, it is possible to release, with an easy operability, the state in which the release of the locking of the first locking mechanism 66 is regulated.

The projection 68b and the operation portion 68c of the release regulating unit 68 are integrally formed of the leaf spring and the projection 68b is biased against the hole 50 due to the elasticity of the leaf spring. In the configuration, it is possible to configure the release regulating unit 68 with much more simplified structure at low costs.

The support member 36 is provided with the deformation regulating portion 62 that regulates the amount of the deformation of the leaf spring. In the configuration, it is possible to prevent excessive deformation of the leaf spring and it is possible to maintain the elasticity of the leaf spring for a long time.

The second locking mechanism 67 is provided to stop the relative rotation of the first link portion 38 and the second link portion 40 in the opening direction of the scanner unit 14 at the unfolded angle α which is smaller than the unfolded angle β formed between the first link portion 38 and the second link portion 40 and the second locking mechanism does not hold the scanner unit 14 in the opening state when the first locking mechanism 66 stops the relative rotation of the first link portion 38 and the second link portion 40. The second locking mechanism 67, the release regulating unit 68, and the first locking mechanism 66 are provided in this order toward the scanner unit 14 from the link connecting portion 40a as the connection site between the first link portion 38 and the second link portion 40 in the support member 36.

In the configuration, before the first locking mechanism 66 locks the scanner unit 14, the second locking mechanism 67 is provided to stop the relative rotation of the first link portion 38 and the second link portion 40 in the opening direction of the scanner unit 14 and not to hold the scanner unit 14 in the opening state. Hence, it is possible for the operator who opens and closes the scanner unit 14 to avoid leaving the scanner unit 14 in the incomplete open state (a state in which the scanner unit 14 is in the opening state, in a state in which the first locking mechanism 66 does not perform the locking of the scanner unit 14), and it is possible to appropriately hold the scanner unit 14 in the opening state.

The second locking mechanism 67, the release regulating unit 68, and the first locking mechanism 66 are provided in this order toward the scanner unit 14 from the link connecting portion 40a as the connection site between the first link portion 38 and the second link portion 40 in the support member 36. In other words, regarding the first locking mechanism 66, since the relative rotation of the first link portion 38 and the second link portion 40 is stopped at a site which is farthest from the link connecting portion 40a, it is possible to reliably stop the relative rotation of the first link portion 38 and the second link portion 40 with small force. As a result, it is possible to reduce deformation or damage to the first locking mechanism 66.

In addition, regarding the second locking mechanism 67, since the second locking mechanism is provided at a position relatively closer to the link connecting portion 40a, it is possible to reduce the size of the second hook 58, that is, it is possible to reduce the size of the second locking mechanism 67 in a case where the second hook 58 stops the relative rotation of the first link portion 38 and the second link portion 40.

Further, to summarize the above description, the printer 10 includes the recording mechanism unit 12 having the recording head 25 which performs recording on the recording medium, the scanner unit 14 which is connected to the top portion of the recording mechanism unit 12 so as to be rotatable with respect to the recording mechanism unit 12 and causes the top portion of the recording mechanism unit 12 to be opened or closed through rotation of the scanner unit, the support member 36 that holds the scanner unit 14 in the opening state, the first connection portion 37 that connects the one end side of the support member 36 to the scanner unit 14, and the second connection portion 74 that connects the other end side of the support member 36 to the recording mechanism unit 12. At least one of the first connection portion 37 or the second connection portion 74 is exposed on the side of the apparatus with the scanner unit 14 in the closing state.

In the configuration, the first connection portion 37 in which the one end side of the support member 36 is connected to the scanner unit 14, and the second connection portion 74 in which the other end side of the support member 36 is connected to the recording mechanism unit 12 are provided. Since at least one of the first connection portion 37 or the second connection portion 74 is exposed on the side of the apparatus with the scanner unit 14 in the closing state, it is possible to connect the support member 36 and the scanner unit 14 or to release the connection between the support member 36 and the recording mechanism unit 12 while the scanner unit 14 is not in the opening state, but in the closing state. In this manner, it is possible to detach the scanner unit 14 from the recording mechanism unit 12 with the easy operability.

In the printer 10, at least the first connection portion 37 is exposed with the scanner unit 14 in the closing state. In the configuration, when the connection of the first connection portion 37 is released, the support member 36 is in a state of being connected only to the recording mechanism unit 12 side. In this manner, it is possible to detach the scanner unit 14 from the recording mechanism unit 12 with the easy operability, without attachment of the support member 36 to the scanner unit 14 when the scanner unit 14 is detached from the recording mechanism unit 12.

In the printer 10, the fixing portions 33a and 33b, which fix the scanner unit 14 to the recording mechanism unit 12 and hold the scanner unit in the closing state, are configured to fix the scanner unit 14 to the recording mechanism unit 12 with the scanner fixing screws 34 that are exposed on the side of the apparatus in the closing state of the scanner unit 14 or to be capable of releasing the fixing.

In the configuration, since the fixing portions 33a and 33b, which fix the scanner unit 14 to the recording mechanism unit 12 and hold the scanner unit 14 in the closing state, are configured to fix the scanner unit 14 to the recording mechanism unit 12 with the scanner fixing screws 34 that are exposed on the side of the apparatus in the closing state of the scanner unit 14 or to be capable of releasing the fixing, it is possible to perform the fixing and the releasing of the fixing of the scanner unit 14 to the recording mechanism unit 12 with the easy operability.

In the printer 10, the hinge portion 28, which connects the scanner unit 14 and the recording mechanism unit 12 in the rotatable manner, is formed to have the hinge shaft 30 that is provided on one side of the scanner unit 14 or the recording mechanism unit 12, and the hinge bearing hole 28a that is provided on the other side and receives the hinge shaft 30. The hinge bearing hole 28a extends in the width direction of the apparatus as the direction in which the scanner unit 14 moves with respect to the recording mechanism unit 12 through the fastening with the scanner fixing screws 34.

In the configuration, since the hinge bearing hole 28a extends (has an elongate hole shape) in the width direction of the apparatus as the direction in which the scanner unit 14 moves with respect to the recording mechanism unit 12 through the fastening with the scanner fixing screws 34, the hinge bearing hole 28a can absorb a difference in expansion of the scanner unit 14 and the recording mechanism unit 12 even when a degree of the expansion thereof in response to the temperature change is different from each other. In other words, the second connection portion 74 can absorb the expansion of the scanner unit 14 and, as a result, it is possible avoid or reduce deformation of the scanner unit 14 or the recording mechanism unit 12.

The support member 36 includes the first link portion 38 that is rotatably connected to the scanner unit 14 with the first connection portion 37, and the second link portion 40 that is rotatably connected to the first link portion 38 and is rotatably connected to the recording mechanism unit 12 via the second connection portion 74. The link connecting portion 40a, which connects the first link portion 38 and the second link portion 40, is configured to have the connection shaft 46 which is provided on one of the first link portion 38 or the second link portion 40, and the elongate hole 54 which is provided on the other one thereof and into which the connection shaft 46 is loosely inserted. The elongate hole 54 is the elongate hole extending in the width direction of the apparatus as the direction in which the scanner unit 14 moves with respect to the recording mechanism unit 12 through fastening with the scanner fixing screws 34 in the closing state of the scanner unit 14.

In the configuration, since the elongate hole 54 is the elongate hole extending in the width direction of the apparatus as the direction in which the scanner unit moves with respect to the recording mechanism unit 12 through fastening with the scanner fixing screws 34 in the closing state of the scanner unit 14, the elongate hole 54 can absorb a difference in expansion of the scanner unit 14 and the recording mechanism unit 12 even when a degree of the expansion thereof in response to the temperature change is different from each other. In other words, the link connecting portion 40a can absorb the expansion of the scanner unit 14 and, as a result, it is possible avoid or reduce deformation of the support member 36, the scanner unit 14, and the recording mechanism unit 12.

The first connection portion 37 has the rotary shaft 42 provided on the one end side of the support member 36, the first attachment member 43 that supports the rotary shaft 42 in a rotatable manner, and the second attachment member 44 provided in the scanner unit 14. In the configuration, the attachment member fixing screw 45, which fixes the first attachment member 43 to the second attachment member 44 and is exposed on the side of the apparatus with the scanner unit 14 in the closing state, can connect and release the connection with the first connection portion 37.

In the configuration, since the attachment member fixing screw 45, which is exposed on the side of the apparatus with the scanner unit 14 in the closing state, can connect and release the connection with the first connection portion 37, it is possible to connect and release the connection with the first connection portion 37 with much easier operability.

The first connection portion 37 and the second connection portion 74 are provided on the inner side of the cover member 26 that configures the external appearance of the apparatus. In the configuration, it is possible to avoid exposure of the first connection portion 37 and the second connection portion 74 during non-maintenance and to secure the appearance of the apparatus by the cover member 26.

In addition, in the embodiment, the support member 36 according to the invention is applied to an ink jet printer as an example of the recording apparatus; however, the support member can be applied to a common liquid ejecting apparatus other than the ink jet printer.

Here, examples of the liquid ejecting apparatus are not limited to a recording apparatus such as a printer, a copy machine, a facsimile, and the like in which an ink jet type recording head is used, an ink is discharged from the recording head, and recording is performed on a recording medium, but include an apparatus in which, instead of the ink, a liquid corresponding to an application is ejected from a liquid ejecting head corresponding to the ink jet type recording head on a ejecting medium corresponding to the recording medium and the liquid is attached to the ejecting medium.

Examples of the liquid ejecting head includes, in addition to the recording head, a color material ejecting head that is used to manufacture a color filter such as a liquid crystal display, an electrode material (conductive paste) ejecting head that is used to form an electrode such as an organic EL display or a field-emitting display (FED), a bioorganic material ejecting head, a sample ejecting head as a precision pipette, or the like.

Note that the invention is not limited to the examples, various modifications can be performed within a range of the invention described in the claims, and it is needless to say that the modifications are included in the range of the invention.

What is claimed is:
1. A recording apparatus comprising:
a recording mechanism unit that has a recording unit which performs recording on a recording medium;
an opening/closing unit that is rotatably connected to the top portion of the recording mechanism unit and that moves rotationally, thereby opening and closing the top portion of the recording mechanism unit; and
a support member that holds the opening/closing unit in an opening state, wherein the support member includes
a first link portion that is rotatably connected to the opening/closing unit, a second link portion that is rotatably connected to the first link portion and is rotatably connected to the recording mechanism unit,
a first locking mechanism that stops a relative rotation of the first link portion and the second link portion in a state in which the first link portion and the second link portion relatively form a first angle therebetween, and that holds the opening/closing unit in the opening state, and
a second locking mechanism that maintains a second angle which is smaller than the first angle by regulating the relative rotation of the first link portion and the second link portion in an opening direction of the opening/closing unit in a state in which the first link portion and the second link portion relatively form the second angle therebetween, and that does not hold the opening/closing unit in an open state,
wherein the opening/closing unit is in an open state in a state where the angle between the first link portion and the second link portion is at the second angle.

2. The recording apparatus according to claim 1, wherein the first angle is an angle at which the first link portion and the second link portion form a straight line shape therebetween.

3. The recording apparatus according to claim 1, further comprising:
a bias unit that biases the support member in a direction in which the first link portion and the second link portion form the first angle therebetween.

4. The recording apparatus according to claim 3, wherein the bias unit is a tension spring that exerts a tensile force between the support member and the recording mechanism unit.

5. The recording apparatus according to claim 1, wherein the second link portion has an extension portion extending from a connection portion with the first link portion toward the opening/closing unit side,
wherein the second locking mechanism has a projecting portion projecting on the extension portion toward the first link portion, and
wherein, in this configuration, the projecting portion comes into contact with the first link portion, and thereby a relative rotation of the first link portion and the second link portion is regulated.

6. The recording apparatus according to claim 5, wherein the connection portion is configured to have a rotary shaft which is provided on one of the first link portion or the second link portion, and an elongate hole which is provided on the other one thereof and into which the rotary shaft is loosely inserted,
wherein a hole, through which the projecting portion penetrates, is formed in the first link portion, and
wherein the first link portion slides toward the extension portion with respect to the second link portion in the state in which the projecting portion comes into contact with the first link portion, and thereby the projecting portion penetrates through the hole such that the first link portion and the second link portion relatively form the first angle therebetween.

7. The recording apparatus according to claim 6, wherein the projecting portion has a hook shape, and
wherein the projecting portion penetrates through the hole so as to hook on an edge of the hole, thereby the second locking mechanism stops, along with the first locking mechanism, the relative rotation of the first link portion and the second link portion in the state in which the first link portion and the second link portion relatively form the first angle therebetween.

8. The recording apparatus according to claim 5, wherein the second locking mechanism and the first locking mechanism are provided in this order from a connection site between the first link portion and the second link portion of the support member toward the opening/closing unit.

9. The recording apparatus according to claim 6, wherein the first locking mechanism is configured to stop the relative rotation of the first link portion and the second link portion by closing the opening/closing unit by an angle corresponding to a moving distance of the rotary shaft inside the elongate hole after opening the opening/closing unit in the state in which the first link portion and the second link portion relatively form the first angle in a process of opening the opening/closing unit.

10. The recording apparatus according to claim 1, wherein the opening/closing unit is configured to have a reading mechanism unit that reads an original document and a feeding mechanism unit that automatically feeds the original document to the reading mechanism unit.

* * * * *